(12) United States Patent
Velummylum et al.

(10) Patent No.: US 10,021,179 B1
(45) Date of Patent: Jul. 10, 2018

(54) LOCAL RESOURCE DELIVERY NETWORK

(75) Inventors: Piragash Velummylum, Seattle, WA (US); Bradley E. Marshall, Seattle, WA (US); Jacob Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/401,715

(22) Filed: Feb. 21, 2012

(51) Int. Cl.
*G06F 15/173* (2006.01)
*H04L 29/08* (2006.01)
*G06F 17/30* (2006.01)

(52) U.S. Cl.
CPC ...... *H04L 67/1095* (2013.01); *H04L 67/2842* (2013.01); *G06F 17/30233* (2013.01)

(58) Field of Classification Search
USPC ....... 707/609, 610, 640, 689, 705, 736, 758, 707/781–784, 805, 812; 709/201–203, 709/208, 212–214, 216–219, 226, 709/245–247; 710/4, 15, 18, 19, 22, 26, 710/28, 36, 44, 68, 74; 711/100, 112, 711/136, 147, 152, 160, 162–164, 173
See application file for complete search history.

(56) References Cited

U.S. PATENT DOCUMENTS

| | | | |
|---|---|---|---|
| 5,063,500 A | 11/1991 | Shorter | |
| 5,341,477 A | 8/1994 | Pitkin et al. | |
| 5,459,837 A | 10/1995 | Caccavale | |
| 5,611,049 A | 3/1997 | Pitts | |
| 5,701,467 A | 12/1997 | Freeston | |
| 5,764,910 A | 6/1998 | Shachar | |
| 5,774,660 A | 6/1998 | Brendel et al. | |
| 5,852,717 A | 12/1998 | Bhide et al. | |
| 5,892,914 A | 4/1999 | Pitts | |
| 5,893,116 A * | 4/1999 | Simmonds | G06F 9/4401 707/612 |
| 5,895,462 A | 4/1999 | Toki | |
| 5,905,248 A | 5/1999 | Russell et al. | |

(Continued)

FOREIGN PATENT DOCUMENTS

| | | |
|---|---|---|
| CA | 2741 895 A1 | 5/2010 |
| CN | 1422468 A | 6/2003 |

(Continued)

OTHER PUBLICATIONS

"Non-Final Office Action dated Jan. 3, 2012," U.S. Appl. No. 12/652,541, filed Jan. 3, 2012; 35 pages.

(Continued)

*Primary Examiner* — Phyllis A Book
(74) *Attorney, Agent, or Firm* — Knobbe, Martens, Olson & Bear, LLP

(57) ABSTRACT

A local area network (LAN) may contain several local computing devices that are in communication with a remote network storage provider that is not part of the LAN. Resources may be available from the remote network storage provider. When a user requests a resource using a first local computing device in the LAN, the first local computing device may check the other local computing devices on that are in the LAN for the resource before requesting the resource from the remote network storage provider. If the resource is available within the LAN, the resource is not requested from the remote network storage provider.

23 Claims, 12 Drawing Sheets

(56) References Cited

U.S. PATENT DOCUMENTS

| | | | |
|---|---|---|---|
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 5,999,274 A | 12/1999 | Lee et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Angles et al. |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 * | 2/2002 | Abe .................. H04L 29/06 707/999.101 |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 * | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 * | 7/2005 | Orbits et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Danker et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |

(56) References Cited

U.S. PATENT DOCUMENTS

| | | | |
|---|---|---|---|
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2* | 4/2009 | Palliyil et al. ............... 709/232 |
| 7,523,181 B2 | 4/2009 | Swildens et al. |
| 7,543,024 B2* | 6/2009 | Holstege ...................... 709/206 |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2* | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2* | 5/2010 | Lev Ran ................ G06F 9/546 709/213 |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1* | 12/2011 | Richardson ......... H04L 67/1097 709/200 |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |

(56) References Cited

U.S. PATENT DOCUMENTS

| | | |
|---|---|---|
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,645 B1 | 10/2012 | Crook |
| 8,321,568 B2 | 11/2012 | Sivasubramanian et al. |
| 8,346,808 B2 * | 1/2013 | Higgins ............ 707/783 |
| 8,380,831 B2 | 2/2013 | Barber |
| 8,402,137 B2 | 3/2013 | Sivasubramanian et al. |
| 8,423,408 B1 | 4/2013 | Barnes et al. |
| 8,433,749 B2 | 4/2013 | Wee et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,527,660 B2 * | 9/2013 | Prasad et al. ............ 709/248 |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,949,459 B1 | 2/2015 | Scholl |
| 8,966,318 B1 | 2/2015 | Shah |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,681 B1 | 8/2016 | Richardson et al. |
| 9,407,699 B2 | 8/2016 | Sivasubramanian et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,554 B2 | 4/2017 | Marshall et al. |
| 9,712,325 B2 | 7/2017 | Richardson et al. |
| 9,712,484 B1 | 7/2017 | Richardson et al. |
| 2001/0000811 A1 | 5/2001 | May et al. |
| 2001/0025305 A1 | 9/2001 | Yoshiasa et al. |
| 2001/0027479 A1 * | 10/2001 | Delaney ............ G06F 17/3087 709/216 |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Jun-hyeong |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |

(56) References Cited

U.S. PATENT DOCUMENTS

| | | |
|---|---|---|
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1* | 3/2004 | Ueda ............ H04L 67/04 709/219 |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |

(56) References Cited

U.S. PATENT DOCUMENTS

| | | |
|---|---|---|
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198334 A1 | 9/2005 | Farber et al. |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218256 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |

(56) References Cited

U.S. PATENT DOCUMENTS

| | | |
|---|---|---|
| 2007/0233846 A1 | 10/2007 | Farber et al. |
| 2007/0233884 A1 | 10/2007 | Farber et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1* | 11/2007 | Tai .................... 370/356 |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0147873 A1 | 1/2008 | Matsumoto |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1* | 9/2008 | Menon et al. ................ 709/231 |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1* | 10/2009 | Schmidt ............ H04N 21/2368 715/751 |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |

(56) References Cited

U.S. PATENT DOCUMENTS

| | | |
|---|---|---|
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0070603 A1 | 3/2010 | Moss et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0057894 A1 | 5/2010 | Glasser |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1* | 7/2010 | Lev Ran .............. G06F 9/546 707/827 |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1* | 10/2010 | Murphy .............. G06F 11/1451 707/652 |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1* | 11/2010 | Zimmerman et al. ........ 709/226 |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0029598 A1* | 2/2011 | Arnold et al. ................ 709/203 |
| 2011/0040893 A1 | 2/2011 | Karaoguz et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1* | 8/2011 | Stuedi et al. ................. 713/150 |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0036238 A1 | 2/2012 | Sundaram et al. |
| 2012/0066360 A1 | 3/2012 | Ghosh |
| 2012/0072600 A1 | 3/2012 | Richardson et al. |
| 2012/0078998 A1 | 3/2012 | Son et al. |
| 2012/0079096 A1* | 3/2012 | Cowan .............. G06F 11/3006 709/224 |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0166516 A1* | 6/2012 | Simmons .......... G06F 17/30233 709/202 |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233522 A1* | 9/2012 | Barton ................... H04L 67/06 714/758 |
| 2012/0233668 A1* | 9/2012 | Leafe et al. ...................... 726/4 |
| 2012/0254961 A1 | 10/2012 | Kim et al. |
| 2012/0257628 A1 | 10/2012 | Bu et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0034099 A1 | 2/2013 | Hikichi et al. |
| 2013/0041872 A1* | 2/2013 | Aizman et al. ................ 707/690 |
| 2013/0046869 A1 | 2/2013 | Jenkins et al. |
| 2013/0055374 A1 | 2/2013 | Kustarz et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1* | 4/2013 | Bhogal .............. G06F 17/30176 707/689 |
| 2013/0117282 A1 | 5/2013 | Mugali, Jr. et al. |
| 2013/0117849 A1 | 5/2013 | Golshan et al. |

(56) References Cited

U.S. PATENT DOCUMENTS

| | | |
|---|---|---|
| 2013/0130221 A1* | 5/2013 | Kortemeyer et al. ........ 434/362 |
| 2013/0133057 A1 | 5/2013 | Yoon et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0263256 A1 | 10/2013 | Dickinson et al. |
| 2013/0268616 A1 | 10/2013 | Sakata et al. |
| 2013/0279335 A1 | 10/2013 | Ahmadi |
| 2013/0305046 A1 | 11/2013 | Mankovski et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0108672 A1 | 4/2014 | Ou et al. |
| 2014/0137111 A1 | 5/2014 | Dees et al. |
| 2014/0143320 A1 | 5/2014 | Sivasubramanian et al. |
| 2014/0164817 A1 | 6/2014 | Bartholomy et al. |
| 2014/0165061 A1 | 6/2014 | Greene et al. |
| 2014/0215019 A1 | 7/2014 | Ahrens |
| 2014/0257891 A1 | 9/2014 | Richardson et al. |
| 2014/0280679 A1 | 9/2014 | Dey et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0006615 A1 | 1/2015 | Wainner et al. |
| 2015/0067171 A1 | 3/2015 | Yum |
| 2015/0081842 A1 | 3/2015 | Richardson et al. |
| 2015/0089621 A1 | 3/2015 | Khalid |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1 | 7/2015 | Petrov |
| 2015/0188994 A1 | 7/2015 | Marshall et al. |
| 2015/0189042 A1 | 7/2015 | Sun et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0215656 A1 | 7/2015 | Pulung et al. |
| 2015/0229710 A1 | 8/2015 | Sivasubramanian et al. |
| 2015/0244580 A1 | 8/2015 | Saavedra |
| 2015/0249579 A1 | 9/2015 | Ellsworth et al. |
| 2015/0256647 A1 | 9/2015 | Richardson et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028644 A1 | 1/2016 | Richardson et al. |
| 2016/0028755 A1 | 1/2016 | Vasseur et al. |
| 2016/0041910 A1 | 2/2016 | Richardson et al. |
| 2016/0065665 A1 | 3/2016 | Richardson et al. |
| 2016/0072720 A1 | 3/2016 | Richardson et al. |
| 2016/0134492 A1 | 5/2016 | Ellsworth et al. |
| 2016/0142367 A1 | 5/2016 | Richardson et al. |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0308959 A1 | 10/2016 | Richardson et al. |
| 2017/0041428 A1 | 2/2017 | Katsev |
| 2017/0085495 A1 | 3/2017 | Richardson et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0180217 A1 | 6/2017 | Puchala et al. |
| 2017/0180267 A1 | 6/2017 | Puchala et al. |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2017/106455 A1 | 6/2017 |

OTHER PUBLICATIONS

"Final Office Action dated Sep. 5, 2012," U.S. Appl. No. 12/652,541, filed Sep. 5, 2012; 40 pages.

"Notice of Allowance dated Jan. 4, 2013," U.S. Appl. No. 12/652,541, Jan. 4, 2013; 11 pages.

"Non-Final Office Action dated Apr. 30, 2014," U.S. Appl. No. 13/842,970; 20 pages.

"Final Office Action dated Aug. 19, 2014," U.S. Appl. No. 13/842,970; 13 pages.

"Notice of Allowance dated Dec. 5, 2014," U.S. Appl. No. 13/842,970; 6 pages.

Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].

"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.

(56) References Cited

OTHER PUBLICATIONS

Gunther et al, "Measuring Round Trip Times to determine the Distance between WLAN Nodes",May 2005, In Proc. of Networking 2005, all pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Kalafut et al., Understanding Implications of DNS Zone Provisioning., Proceeding IMC '08 Proceedings of the 8th AMC SIGCOMM conference on Internet measurement., pp. 211-216, ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report for European Application No. 09839809.2 dated May 11, 2015.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 dated Nov. 19, 2012.
Examination Report in Singapore Application No. 201103333-9 dated Aug. 13, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Examination Report in Singapore Application No. 201301573-0 dated Dec. 22, 2014.
First Office Action in Chinese Application No. 201180053405.6 dated May 3, 2015.
Office Action in Japanese Application No. 2013-540982 dated Jun. 2, 2014.
Written Opinion in Singapore Application No. 201303521-7 dated May 20, 2014.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Armour et al.: "A Heuristic Algorithm and Simulation Approach to Relative Location of Facilities"; Management Science, vol. 9, No. 2 (Jan. 1963); pp. 294-309.
Horvath et al., "Enhancing Energy Efficiency in Multi-tier Web Server Clusters via Prioritization," in Parallel and Distributed Processing Symposium, 2007. IPDPS 2007. IEEE International , vol., no., pp. 1-6, Mar. 26-30, 2007.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Fifth Office Action in Chinese Application No. 200980111426.1 dated Aug. 14, 2015.
Office Action in Japanese Application No. 2014-225580 dated Oct. 26, 2015.
Second Office Action in Chinese Application No. 201180046104.0 dated Sep. 29, 2015.
Office Action in Canadian Application No. 2816612 dated Nov. 3, 2015.

(56) References Cited

OTHER PUBLICATIONS

"Global Server Load Balancing with ServerIron," Foundry Networks, retrieved Aug. 30, 2007, from http://www.foundrynet.com/pdf/an-global-server-load-bal.pdf, 7 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved from May 3, 2006, http://www.eWeek.com/article2/0,1895,1772626,00.asp, 5 pages.

"Scaleable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.

Baglioni et al., "Preprocessing and Mining Web Log Data for Web Personalization", LNAI 2829, 2003, pp. 237-249.

Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).

Bellovin, S., "Distributed Firewalls," ;login;:37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement it? —Egress Filtering v 0.2," Feb. 29, 2000, SANS Institute, http://www.sans.org/infosecFAQ/firewall/egress.htm, 6 pages.

Byun et al., "A Dynamic Grid Services Deployment Mechanism for On-Demand Resource Provisioning", IEEE International Symposium on Cluster Computing and the Grid:863-870, 2005.

Chipara et al, "Realtime Power-Aware Routing in Sensor Network", IEEE, 2006, 10 pages.

Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al., A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Datavase Maintenance," 1987, Proceedings of the sixth annual ACM Symposium on Principles of Distributed Computing, Vancouver, British Columbia, Canada, Aug. 10-12, 1987, 12 pages.

Gruener, J., "A Vision of Togetherness," May 24, 2004, NetworkWorld, retrieved May 3, 2006, from, http://www.networkworld.com/supp/2004/ndc3/0524virt.html, 9 pages.

Gunther et al, "Measuring Round Trip Times to determine the Distance between WLAN Nodes", Dec. 18, 2004, Technical University Berlin, all pages.

International Preliminary Report on Patentability in PCT/US2007/007601 dated Sep. 30, 2008 in 8 pages.

International Preliminary Report on Patentability in PCT/US2011/053302 dated Apr. 2, 2013.

International Preliminary Report on Patentability in PCT/US2011/061486 dated May 22, 2013.

International Search Report and Written Opinion in PCT/US07/07601 dated Jul. 18, 2008 in 11 pages.

International Search Report and Written Opinion in PCT/US2011/053302 dated Nov. 28, 2011 in 11 pages.

International Search Report and Written Opinion in PCT/US2011/061486 dated Mar. 30, 2012 in 11 pages.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kenshi, P., "Help File Library: Iptables Basics," Justlinux, retrieved Dec. 1, 2005, from http://www.justlinux.com/nhf/Security/Iptables_Basics.html, 4 pages.

Liu et al., "Combined mining of Web server logs and web contents for classifying user navigation patterns and predicting users' future requests," Data & Knowledge Engineering 61 (2007) pp. 304-330.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2003, from http://www.computerworld.com/printthis/2002/0,4814,76159,00.html, 3 pages.

Virtual Iron Software Home, Virtual Iron, retrieved May 3, 2006, from http://www.virtualiron.com/, 1 page.

(56) References Cited

OTHER PUBLICATIONS

Waldspurger, CA., "Spawn: A Distributed Computational Economy," Feb. 1992, IEEE Transactions on Software Engineering, 18(2): 103-117, I5 pages.

Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.

Xu et al., "Decision tree regression for soft classification of remote sensing data", Remote Sensing of Environment 97 (2005) pp. 322-336.

Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.

Zhu, Xiaoyun, et al., "Utility-Driven Workload Management Using Nested Control Design," Mar, 29, 2006, HP Laboratories Palo Alto, HPL-2005-193(R.1), retrieved Aug. 30, 2007, from http://www.hpl.hp/com/techreports/2005/HPL-2005-193R1.pdf, 9 pages.

Guo, F., Understanding Memory Resource Management in Vmware vSphere 5.0, Vmware, 2011, pp. 1-29.

Hameed, CC, "Disk Fragmentation and System Performance", Mar. 14, 2008, 3 pages.

Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.

Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.

Office Action in European Application No. 09839809.2 dated Dec. 8, 2016.

Office Action in European Application No. 11767118.0 dated Feb. 3, 2017.

Supplementary Examination Report in Singapore Application No. 11201501987U dated May 17, 2017.

International Search Report and Written Opinion in PCT/US/2016/066848 dated May 1, 2017.

Sharif et al, "Secure In-VM Monitoring Using Hardware Virtualization", Microsoft, Oct. 2009 http://research.microsoft.com/pubs/153179/sim-ccs09.pdf; 11 pages.

Office Action in Japanese Application No. 2011-502139 dated Aug. 17, 2015.

Office Action in Japanese Application No. 2014-225580 dated Oct. 3, 2016.

Office Action in Japanese Application No. 2011-516466 dated May 30, 2016.

Partial Supplementary Search Report in European Application No. 09826977.2 dated Oct. 4, 2016.

Office Action in Chinese Application No. 201310717573.1 dated Jul. 29, 2016.

Third Office Action in Chinese Application No. 201180046104.0 dated Apr. 14, 2016.

Decision of Rejection in Chinese Application No. 201180046104.0 dated Oct. 17, 2016.

Office Action in Canadian Application No. 2816612 dated Oct. 7, 2016.

Second Office Action in Chinese Application No. 201180053405.6 dated Dec. 4, 2015.

Office Action in Japanese Application No. 2015-533132 dated Apr. 25, 2016.

Office Action in Canadian Application No. 2884796 dated Apr. 28, 2016.

Office Action in Russian Application No. 2015114568 dated May 16, 2016.

Office Action in Japanese Application No. 2015-075644 dated Apr. 5, 2016.

Office Action in European Application No. 07754164.7 dated Dec. 14, 2015.

Office Action in Chinese Application No. 201310537815.9 dated Jul. 5, 2016.

Office Action in Chinese Application No. 201310537815.9 dated Jun. 2, 2017.

* cited by examiner

LOCAL RESOURCE DELIVERY NETWORK

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet.

A user may have own several digital resources (such as, photos, videos, document files, audio files, for example) that they store on one or more computing devices under the user's control. The storage available on the user's computing device is limited and as a result, they user may not be able to store a large volume of resources, or store resources that are large in size. In addition, the user may wish to access the same resource across multiple computing devices. For example, the user may desire to access a file from his work computer, his home computer, or his mobile computing device. As a result, a user may decide to store some resources remotely using a network storage provider. The user may be able to upload or store the resource to the remote network storage provider using a first computing device and access the resource using a second computing device. In addition, a user may store infrequently accessed resources on the remote network storage device to make room for frequently accessed resources on his computing devices.

DETAILED DESCRIPTION

Overview

Figure 1:
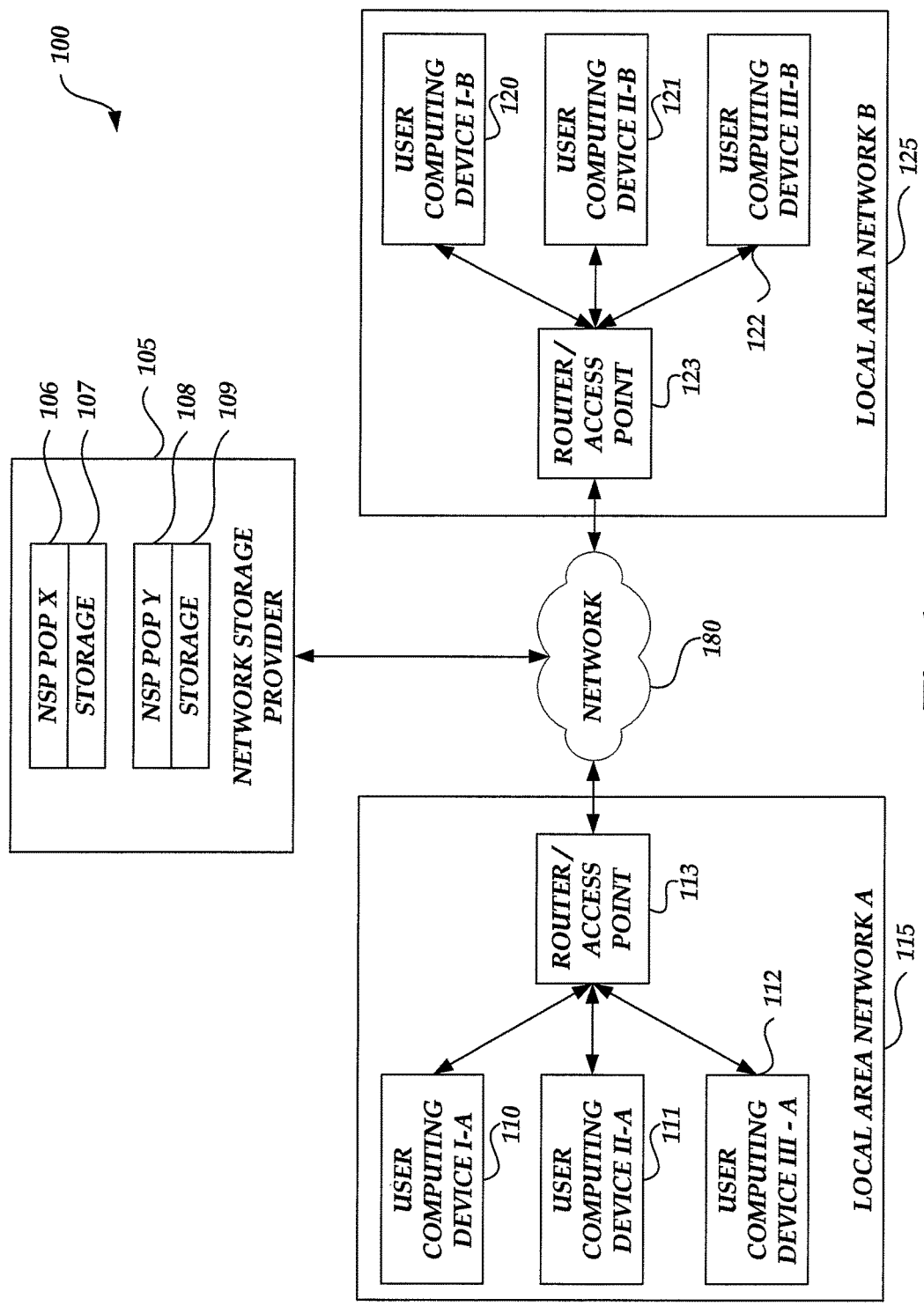
FIG. 1 illustrates one embodiment of a resource delivery environment containing a network storage provider in communication with two local area networks.

Use of a remote network storage provider enables a user to store infrequently used resources or large resources, or to share resources among several computing devices. Current use of a remote network storage provider typically requires a computing device to request a resource from the remote network storage provider which is not associated with its local area network (LAN). In some cases, a user may be sharing a resource among several computing devices that are nodes of the same LAN. For example, a resource may be shared between a desktop computer and a tablet within the same LAN. In such cases, the retrieval of the resource from the remote network storage provider may be unnecessary and inefficient. For example, if the resource is available from another node computer within the LAN, it can be retrieved easier and more efficiently locally.

Accordingly, the present disclosure is directed to the management of resources within a LAN. In one embodiment, a user computing device is associated with a LAN and may be in communication with a remote network storage provider. A user operating the user computing device may request a resource. The user computing device may, in some embodiments, detect other computing devices connected to the LAN. The user computing device may also determine if any of the detected computing devices have the resource requested by the user. If none of the detected computing devices have the resource, or if the detected computing devices have an outdated version of the resource, the user computing device may request the resource from the remote network storage provider. Alternatively, if one of the detected computing devices has the resource, the user computing device may obtain the resource from the detected computing device storing the resource. In some embodiments, the user may upload to and request resources from the remote storage computing device using a resource manager client.

For example and illustrative purposes only, suppose a user uses a remote network storage provider to store photos. The user may utilize a resource manager client executing on his laptop to upload "photo1.jpg" to the remote network storage provider. The laptop may be connected and part of the user's home wireless network (e.g., the user's LAN), but the remote network storage provider may not be connected to the LAN and is accessible only through a wide-area network such as the Internet. Once uploaded, a first copy of "photo1.jpg" is stored at the laptop, and a second copy of "photo1.jpg" is stored at the network storage provider. In addition to the laptop, the user may also have a mobile phone connected, and part of, the LAN. The user may want to view "photo1.jpg" on the mobile phone. Typically, the mobile phone would request "photo1.jpg" from the remote network storage provider through a website or mobile application. In the embodiments disclosed herein, however, the mobile phone may first check to see if "photo1.jpg" is available from a computing device within its LAN. If the photo is available, the mobile phone may request it from the computing device within its LAN. For example, when the user requests "photo1.jpg" from the mobile phone, the mobile phone may determine that it is available from the laptop. The laptop may then provide "photo1.jpg" to the mobile phone.

More generally, in one embodiment, a first computer system on a LAN determines one or more computer systems that are also connected to the LAN. The first computer system may receive a request from a user for a resource and may also access metadata associated with the resource to determine if a second computer system locally associated with the LAN has a version of the resource. If the resource is available from the second computer system on the LAN, the first computer system retrieves the resource from the second computer system. If the resource is not available from a computer system on the LAN, the first computer system may retrieve the resource from a remote network storage provider. In some embodiments, the accessed metadata may be stored on the first computer system or in other embodiments, the accessed metadata may be stored on another computer within the local area network or on the remote network storage provider. Embodiments may also include the first computer system monitoring metadata stored on the remote network storage provider for updates to the resource and pre-fetching the resource based in part on the metadata. Other embodiments may also include a remote network storage provider or a second computer system on the LAN storing a resource having a first attribute or characteristic and providing the resource to the first computer system with a second attribute or characteristic. For example, the remote network storage provider (or second computer system on the LAN) may store a resource with the file name "FileFromNetworkStorageProivder156664.txt" (first attribute or characteristic) and it may provide the resource with a second file name, "File1.txt" (second attribute or characteristic) to the first computer system. By way of further example, the remote network storage provider (or second computer system on the LAN) may store a resource in a first format (first attribute or characteristic) and provide the resource in a second format (second attribute or characteristic) to the first computer system.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described. Further, although various aspects of the disclosure will be described with regard to illustrative examples and embodiments, it can be appreciated that the disclosed embodiments and examples should not be construed as limiting. For example, although the present application will be discussed with respect to certain computing devices, it can be appreciated that the systems, methods, and process described for managing resources may be applied to any computing device that may share resources within a network.

Example Resource Delivery Environment

FIG. 1 illustrates one embodiment of a resource delivery environment 100 containing a network storage provider (NSP) 105 in communication with two local area networks (LANs) 115, 125. In the illustrative embodiment of FIG. 1, the NSP communicates with the LANs via network 180. The NSP may store resources of user computing devices 110, 111, 112, 120, 121, 122 that communicate with the NSP through router/access point 113, 123 and network 180. In one embodiment, a user may upload a resource comprising digitized data (such as a document, video, audio file, image, or the like) to the NSP 105 thereby storing the resource at the NSP. After uploading the resource, the user may access the uploaded resource with any one of its user computing devices 110, 120. Thus, the NSP may act as a means to share resources among the user's computing devices and networks. In addition, the NSP may serve the function of providing additional storage to the user. For example, the NSP may provide storage for the user to archive multiple versions of a document, serve as storage for infrequently used files, or provide storage for backups.

The resource delivery environment 100 in FIG. 1 may be computerized, wherein each of the illustrated components comprises a computing device that is configured, amongst other things, to communicate with other computer devices via network 180. For example, each of the user computing devices 110, 111, 112, 120, 121, 122 may comprise a computing device, such as a desktop, notebook, mobile device, cell phone, tablet, handheld computing device, or other general purpose computing device that may be configured to transmit and receive data to/from other computing devices and LANs via network 180. Depending on the embodiment, network 180 may comprise one or more of any type of network, such as one or more wide area networks, personal area networks, telephone network, and/or the Internet, which may be accessed via any available wired and/or wireless communication protocols. Any other combination of networks, including secured and unsecured network communication links, are contemplated for use in the systems described herein.

In some embodiments, a user may connect his/her user computing devices 110, 120 to a local area network, or LAN. Generally, a LAN is a computer network that interconnects computers in a limited area such as a home, school, office, computer laboratory or shopping area. As is known in the art, one of the defining characteristics of a LAN is relatively high data transfer rates between computing devices that are part of the LAN due to the close proximity of the computing devices. In some embodiments, the LAN may be a wireless LAN, thereby permitting computing devices to connect to the LAN without the use of a cable or wire. In other embodiments, the LAN may be implemented in a wired fashion where computing devices may be connected through the use of a cable or wire.

In some embodiments, the LAN 115, 125 may include a router/access point 113, 123. The router/access point may facilitate communications between the nodes of the LAN such as user computing devices 110, 111, 112. The router/access point may also facilitate communicates between the nodes of the LAN and other computers connected through a wide area network (WAN). For example, in the illustrative embodiment of FIG. 1, router/access point 111 may facilitate communication between user computing device I-A 110A and network storage provider 105. The router/access point 113 may facilitate communication by forwarding data packets using a standard networking protocol such as TCP/IP, for example. In some embodiments, the router/access point 113 may also comprise a modem for connecting nodes of the LAN with computing devices that are not part of the LAN.

As shown in FIG. 1, in some embodiments, the resource delivery environment 100 may include more than one LAN. Each LAN may be geographically or logically separate. For example, LAN A 115 may be the user's home computer network while LAN B 125 may be the user's computer network at her office. Alternatively, the LANs may be geographically co-located but logically separated. For example, LAN A 115 and LAN B 125 may be located within the same office building, but may be separated for security reasons, bandwidth considerations, or other organizational criteria.

With continued reference to FIG. 1, the resource delivery environment 100 can also include a network storage provider 105 in communication with the one or more LANs 115, 125. The network storage provider 105 illustrated in FIG. 1 also corresponds to a logical association of one or more computing devices associated with a network storage provider. Specifically, the network storage provider 110 can include a number of network storage provider Point of Presence ("NSP POP") locations 106, 108 that correspond to nodes on the communication network 180. Each NSP POP 106, 108 includes a storage component 107, 109 made up of a number of storage devices for storing resources which will be managed and processed by the network storage provider 110 and transmitted to various LANs, such as LAN 115, 125. The storage components 107, 108 may further include additional software and/or hardware components that facilitate communications including, but not limited to, load balancing or load sharing software/hardware components. In addition, the storage components 107, 108 may include a scalable, resizable compute capacity.

In some embodiments, the storage components 107, 108 may store resources uploaded by user computing devices 110, 120 to the NSP. The NSP 105 may allocate a portion storage space for a user to store resources ("user's NSP allocation"). The NSP 105 may restrict access to the user's NSP allocation to other users, thereby making the user's NSP allocation secure. For example, the NSP may allocate 20 GB of storage space to a designated user for the storage of resources. Additionally, the NSP may restrict access to the designated user's allocation of storage space to other users of the NSP. The NSP may, in some embodiments, require verification of user credentials, such as a user name and password. A user may upload a resource from a user computer device 110 to the user's NSP allocation of storage 107, 109 or the user may request a resource stored on the user's NSP allocation. The storage components 107, 108 may also store metadata describing the resources, thereby facilitating efficient management of resources. The content and format of the metadata is described in more detail below with respect to FIG. 2.

In an illustrative embodiment, the storage components 107, 108 are considered to be logically grouped, regardless of whether the components, or portions of the components, are physically separate. Additionally, although the NSP POPs 106, 108 are illustrated in FIG. 1 as logically associated with the network storage provider 110, the NSP POPs may be geographically distributed throughout the communication network 180 in a manner to best serve various demographics of user computing devices and LANs. Additionally, the network storage provider 105 can be associated with various additional computing resources, such additional computing devices for administration of content and resources, DNS name servers, and the like.

Example Components of User Computing Devices

Figure 2:
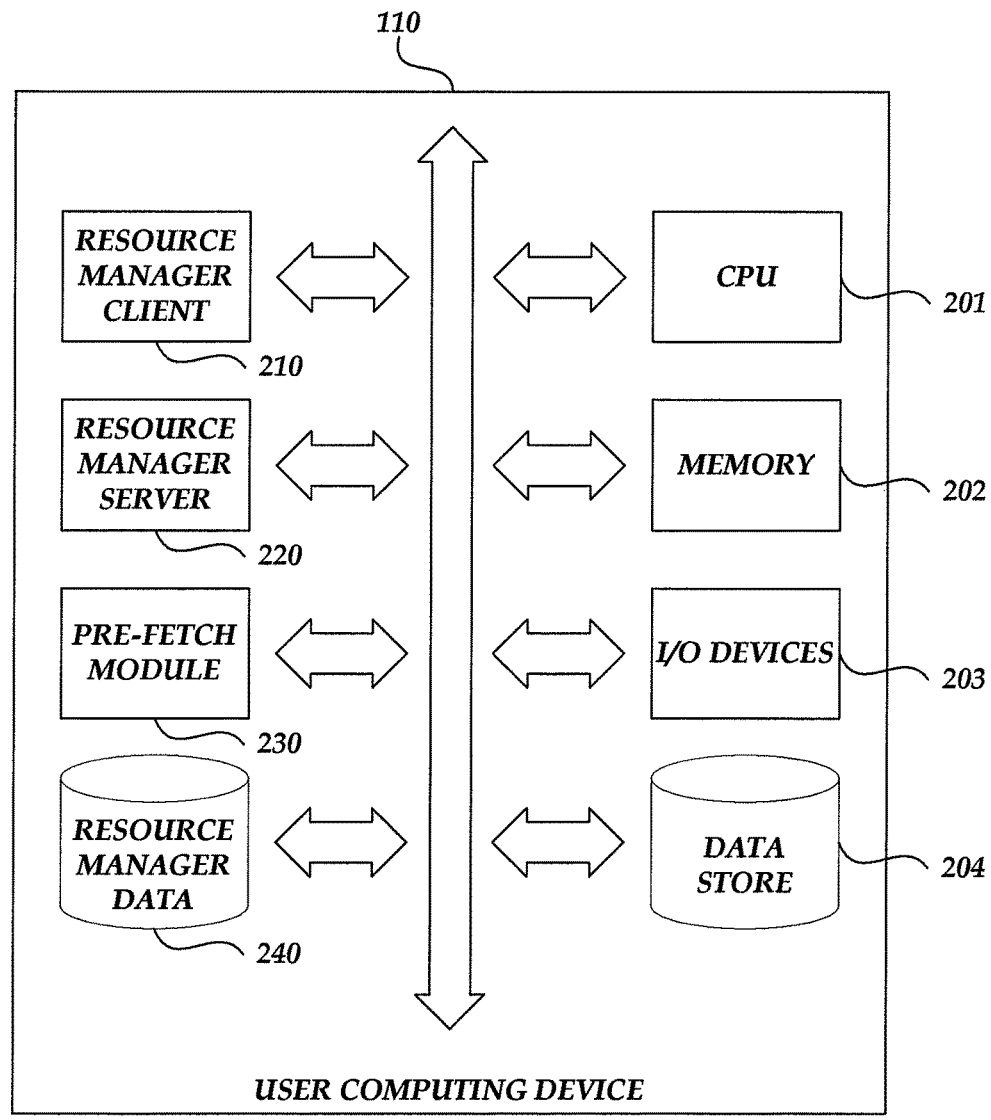
FIG. 2 illustrates one embodiment of a user computer device including a resource manager client, resource manager server, pre-fetch module and resource manager data.

FIG. 2 illustrates one embodiment of a user computing device 110 including a resource manager client 210, a resource manager server 220, a pre-fetch module 230 and resource manager data 240, which may be modules or components of software code that when executed perform the processes described in FIGS. 3-6. Although the functionality of each module will be discussed with reference to particular functions, each module may perform additional functions, and in some embodiments some modules may perform the functionality of other modules herein described. For example, in some embodiments, functionality described herein as being preformed by the resource manager client 210 may be performed by the resource manager server 220. In addition to the resource manager client 210, resource manager server 220, pre-fetch module 230 and resource manager data 240, the user computer device 110 may also have a CPU 201, a memory 202, input-output (I/O) devices 203, and a data store 204. However, generally, the configuration of each user computing device may vary. For example, each computing device may have different CPU capacities or configurations. Additionally, one or more of the above illustrated components, such as a data store, may be omitted.

In some embodiments, the resource manager client 210 is a module or component that facilitates the management of resources for a user. The resource manager client 210 may be an executable application, or "front-end", that provides a mechanism for the user to interact with the user computing device 110 to upload resources to the NSP and request resources from the NSP or other user computer devices. The resource manager client 210 may be, in some embodiments, an application capable of being displayed in a web browser such as a dynamic web page or web application. In other embodiments, it may be a separate executable with a graphic user interface (GUI) for choosing which resources to upload to the NSP or which resources to request from the NSP or the other user computing devices within the user computing device's LAN. In some embodiments, the resource manager client 210 may integrate with the existing file browser of the user computing device nd provide the user with the ability to manage resources through the use of context sensitive menus. In other embodiments, the resource manager client 210 may be a command line tool allowing the user to manage resources through the use of commands or scripts. Some embodiments may combine elements of a command line tool, integrated tool or stand alone tool.

The resource manager client 210 may provide, among other things, the basic functionality to manage resources which may include uploading resources, retrieving resources, providing status of resources, providing version information and location information of resources, and providing an list of resources available in the user's NSP allocation. For example, the resource manager client 210 may provide the basic functionality through a list interface, tree interface or command line prompt. For example, a user may be able to upload a resource using a file chooser user interface component that is displayed by the resource manager client 210. In a command line embodiment, a user may be able to access the basic functionality through the use of command line prompts. In some embodiments, the resource manager client 210 may interact or interface with another application. For example, the resource manger client 210 may be a plug-in to a web or file browser, or may integrate with applications that create or edit resources such as word processing applications, photo editing applications, or video editing applications, for example.

The resource manager client 210 may also facilitate the retrieval of resources. For example, after displaying the list of available resources to the user, the user may be able to select a particular resource for retrieval by clicking on the resource or otherwise selecting it. In other embodiments, resource retrieval may be facilitated by the resource manager client 210 through the use of a command whereby the user provides the name or unique identifier of the resource for retrieval. For example, this may be done through the use of a command line tool or text box. In some embodiments, the resource manager client 210 may allow the user to allocate space in the local data store 204 ("user's local allocation") to mirror the resources, or a subset of the resources, available from the NSP 105. In such embodiments, the resource manger client 210 may allow the user to perform a "Get All" operation which will retrieve all of the available resources from the user's NSP allocation or all the resources of a particular group or subset available from the NSP 105 within the user's NSP allocation.

In some embodiments, the resource manager client 210 may communicate with the resource manger server 220 to determine the current status of resources, or to perform resource put (upload) or get (retrieval) operations. The resource manager server 220 may be a background process, or daemon, executing in the background of the user computing device. In other embodiments, the resource manager server 220 may execute as a daemon on a dedicated server located on the LAN of the user computing device 110. The resource manger server 220 may expose a network socket allowing the resource manager client 210, or other resource manager server instances within the LAN to connect to it in order to request a resource, get status on a resource, or upload a resource to the NSP. The resource manager server 220 may also establish connections to the NSP or other resource manager server instances within the LAN to request resources, receive resources, request and receive status, and receive and request resource availability data.

The resource manager server 220 may manage resources with the assistance of metadata describing the resources, which will be generally referred to as "metadata". Illustratively, metadata may include data that describes a resource and facilitates the management of resources without the need to manipulate the resource itself. Since the metadata is likely smaller than the resource, it can be transferred more efficiently throughout the resource delivery environment thereby minimizing network bandwidth. The metadata may include, among other things: a unique resource identifier that uniquely identifies the resource, status information pertaining to the resource (such as whether the resource is locally available or whether a locally available resource is synched with the version of the resource stored at the NSP), version information, whether the resource has been edited locally and/or the computing devices from which the resource may be available. In some embodiments, the resource manager server 220 may store the metadata in the resource manager data store 240.

In some embodiments, the metadata may also include authentication information related to the resource. For example, the metadata may include an encrypted token that restricts access to the resource to only those resource manager server instances capable of decrypting the token. In other embodiments, the metadata may include authentication information that describes the identity of the resource manager server instances that may access the resource. For example, upon installation, each resource manager instance may generate a unique key that is encrypted and registered with the NSP 105. A user may be able to grant permission to a resource manager instance to access a resource. At that time, the metadata of the resource may be updated to include the encrypted unique key of the resource manager server instance. In other embodiments, the metadata may be encrypted so that only those authorized resource manager service instances may access the metadata. Encryption of tokens, unique identifiers, and metadata may be done using any known encryption algorithm.

In some embodiments, the resource manager client 210 may display some or all of the metadata in a GUI so that the user may know the status of resources. In other embodiments, the metadata may be hidden from the user so that from the user's perspective all resources from the user's NSP allocation appear to be locally available. In such embodiments, when the user selects a resource for viewing or modifying, the resource manager server 220 may use the metadata to determine if the resource needs to be retrieved, and if so, from which computing device to retrieve the resource.

The resource manger server 220 may perform some resource management functions periodically. For example, the resource manager server 220 may periodically request metadata updates from the NSP. The resource manager server 220 may request from the NSP an updated metadata set for the resources in the user's NSP allocation. The NSP, in response, may provide an updated metadata set to the resource manager server 220, which may then notify the resource manager client 210 with updates if needed.

In some embodiments, the resource manager server 220 may periodically broadcast on the LAN a notification data packet that may notify other resource manager servers on the LAN that it is participating in the resource delivery environment 100. The resource manager server 220 may also check for other resource manager server instances that are executing in the user computing device's LAN by executing a packet analyzer or network sniffer configured to detect the broadcast of notification data packets originating from other resource manager server instances. In one embodiment, the notification data packet may provide enough data to notify the resource manager server 220 of the other instances of the resource manager server. In other embodiments, the notification data packet may include additional data, such as metadata related to the resources that could be served from the resource manager server.

In some embodiments, the resource manager server 220 may also maintain a list or data structure tracking the available computing devices on its LAN as well as those participating in the resource delivery environment 100 (that is, those computing devices running a resource manager server instance). The list or data structure may contain, for example, the IP address of the participating computing device, a device identifier used by the resource delivery environment 100 to identify the computing device, or resources available from the participating computing device. In some embodiments, the resource manager server 210 may access or consult the list or data structure before it requests a resource from the NSP 105. For example, the resource manager server 220 may use the list or data structure to determine which computing devices to poll for a resource request (see FIGS. 4A-4B) or it may use the list to determine which computing device has the most recent version of a resource. In some embodiments, the list or data structure is stored in the resource manager data store 240.

In some embodiments, user computing devices may not be optimized to, capable of, or configured to process resources having particular attributes or characteristics. In such embodiments, the resource manager server 220 may, for example, change an attribute or characteristic of a resource, or otherwise create a new version of a resource having the preferred attribute or characteristic, before providing it to a requester. This may occur in embodiments where a first user computing device on the LAN stores and processes resources having a first attribute or characteristic, while a second user computing device on the LAN processes resources more efficiently when they have a second differing attribute or characteristic. For example, a first user computing device that is a desktop might store a video resource in an uncompressed video format. A second user computing device, such as mobile phone, may request the resource. Due to the limited storage capacity of the mobile phone, the mobile phone may process the video more efficiently in a compressed format. When the mobile phone requests the video resource from the desktop, it may request the desktop to reformat the video into the compressed format. In others embodiments, the resource manger server 220 may also contain a module that allows for streaming of video or audio resources. That is, as opposed to converting the resource to a different format before delivery, the resource manager server 220 may stream it to the requester. In other embodiments, an attribute of the resource may be changed. For example, the resource manager server 220 may provide a resource in a read-only format, or it may truncate or shorten a file name before providing the resource to the requester.

The resource manager server 220 may also contain or communicate with pre-fetch module 230. The pre-fetch module 230 may analyze metadata describing the resources available ("resource availability data") on the user's NSP allocation and determine whether any of the data should be requested before the user requests the resource. For example, the pre-fetch module 230 may analyze the resource availability data and obtain the most recently added or updated resource. In other embodiments, a user may be able to configure the pre-fetch module through the use of pre-fetch preferences. A user may, for example, set a preference to pre-fetch resources of a particular file type or with file names containing particular strings of characters. For example, a user may define pre-fetch preferences on his work computing device to pre-fetch any resources available from the user's NSP allocation that is a word processing file or any file with the string "work" in the filename. To facilitate pre-fetching, the resource manager server 220 may periodically request updated metadata from the NSP, extract the resource availability data from the metadata, and then feed the pre-fetch module the resource availability data. The pre-fetch module may then analyze the resource availability data in light of the pre-fetch preferences and pre-fetch resources accordingly.

In some embodiments, the resource manager server 220 accesses the data store 204 of the user computing device to store resources retrieved from the NSP or from other user computing devices executing a resource manager server instance on the LAN. In some embodiments, the resource manager server 220 may be configured to utilize a portion of the data store 204 for resources ("user's local allocation"). The user's local allocation may be smaller than the user's NSP allocation. For example, the user's local allocation may be 5 GB of storage while the user's NSP allocation may be 100 GB of storage. In such embodiments, the resource manager server 220 may manage the resources in the user's local allocation so that the user's local allocation is not exceeded. In some embodiments, the resource manager server 220 may utilize a first-in-first-out (FIFO) algorithm for managing the resources, thereby removing those resources that are likely to be out of date or less frequently used. In other embodiments, the resource manager server 220 may remove the less frequently accessed resources first.

Examples of Data Flow Between Components

Figure 3A:
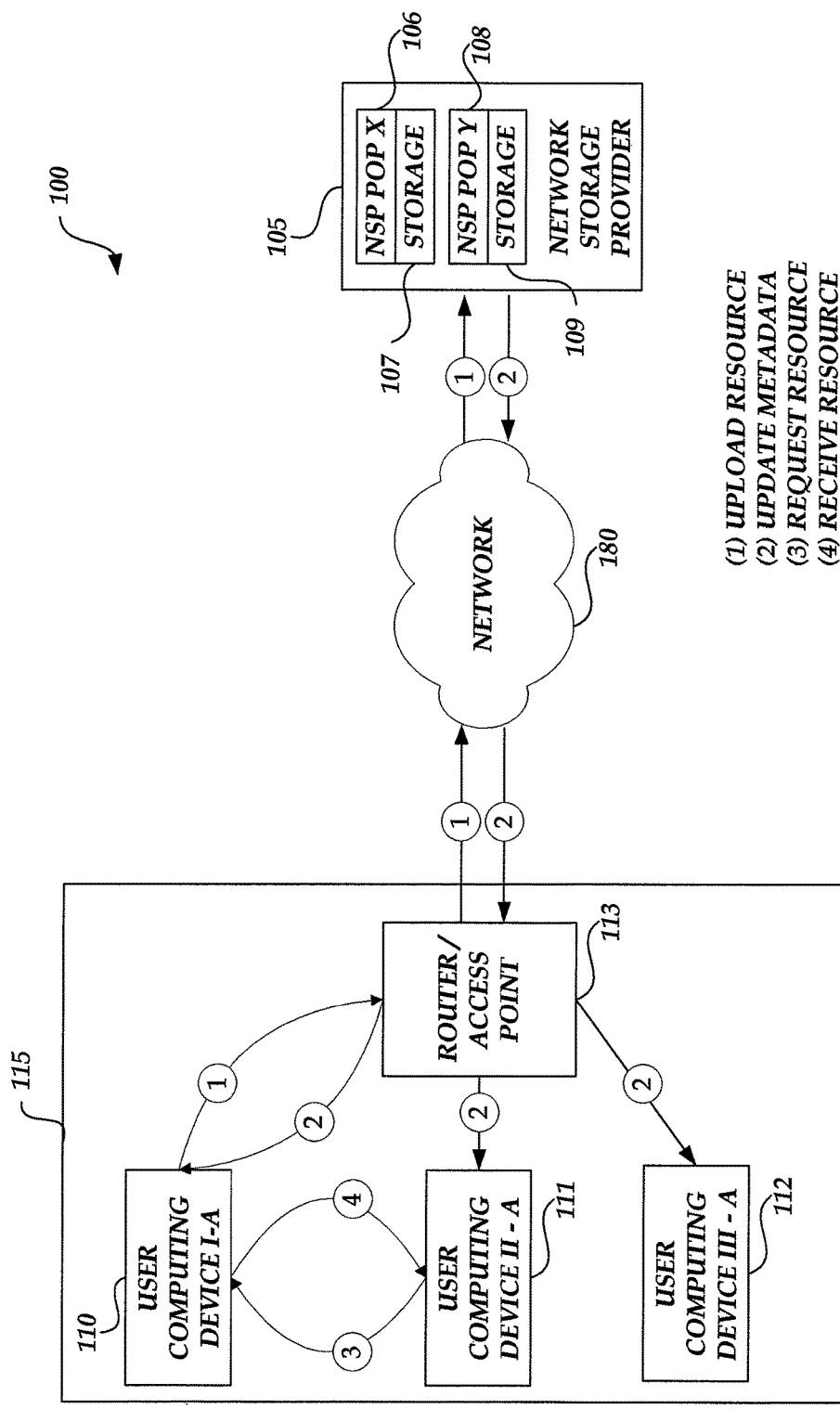
FIG. 3A illustrates one embodiment of the flow of data for uploading and requesting a resource.
Figure 3B:
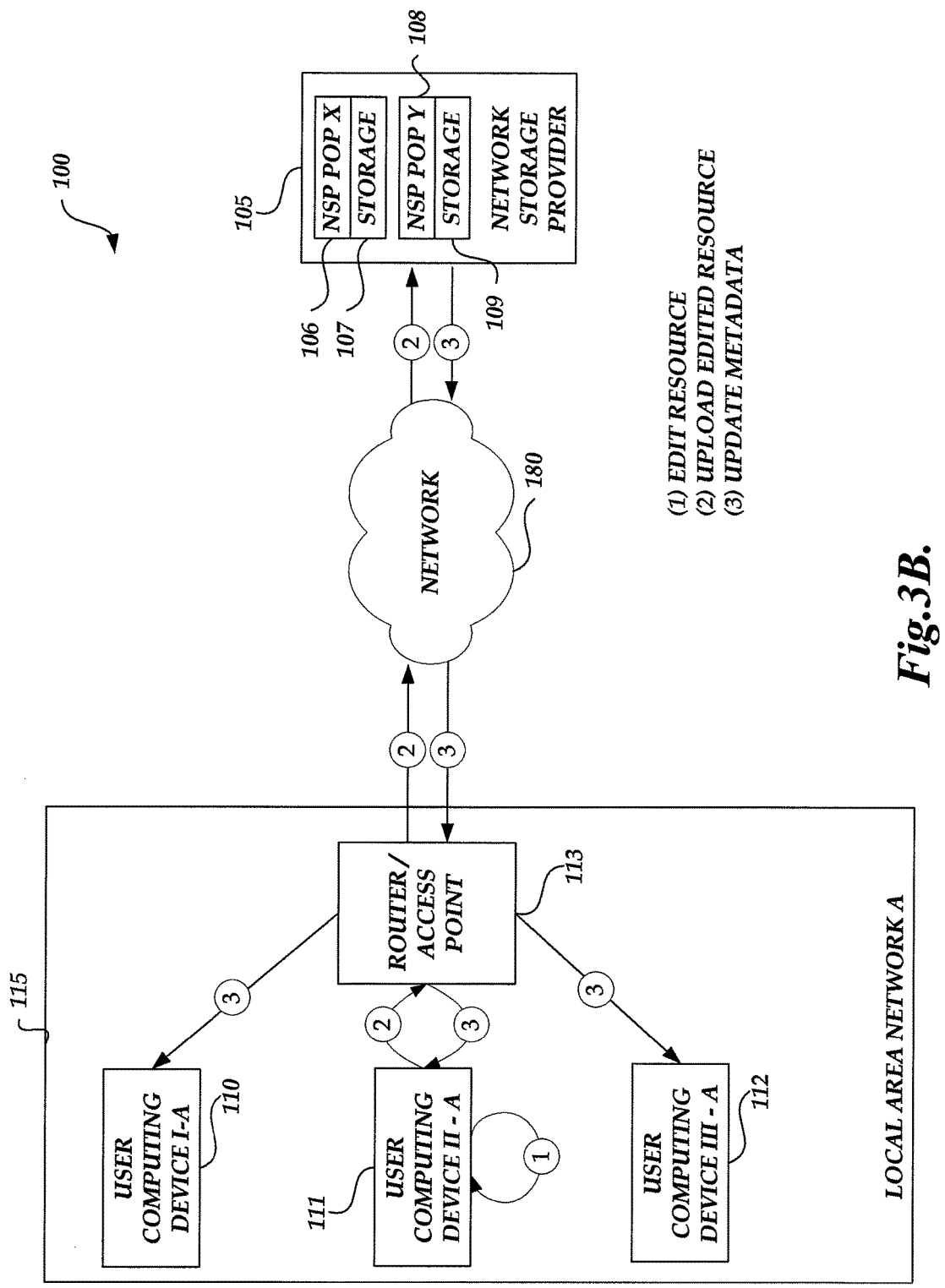
FIG. 3B illustrates one embodiment of the flow of data for editing and uploading a resource.
Figure 3C:
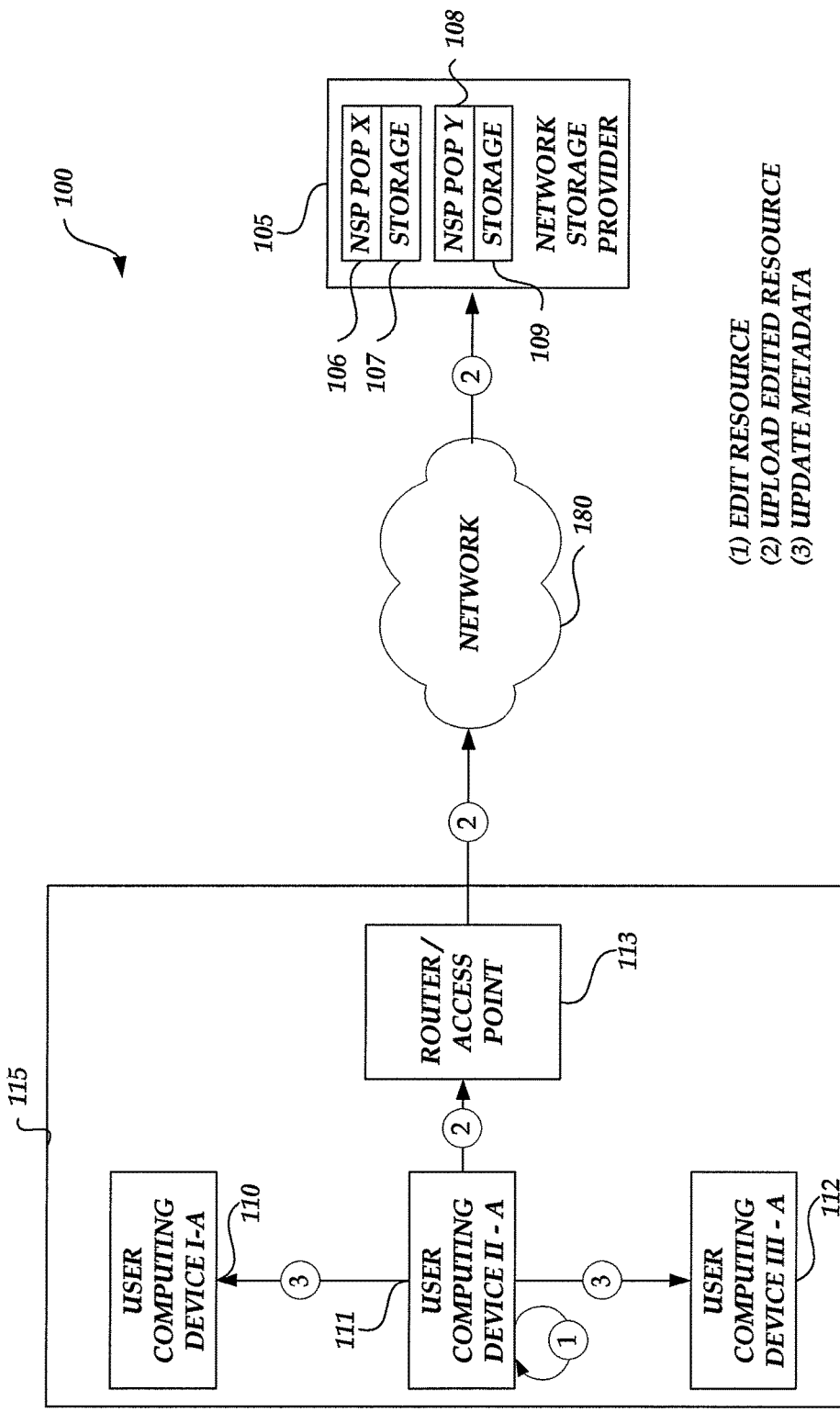
FIG. 3C illustrates another embodiment of the flow of data for editing and uploading a resource.
Figure 4A:
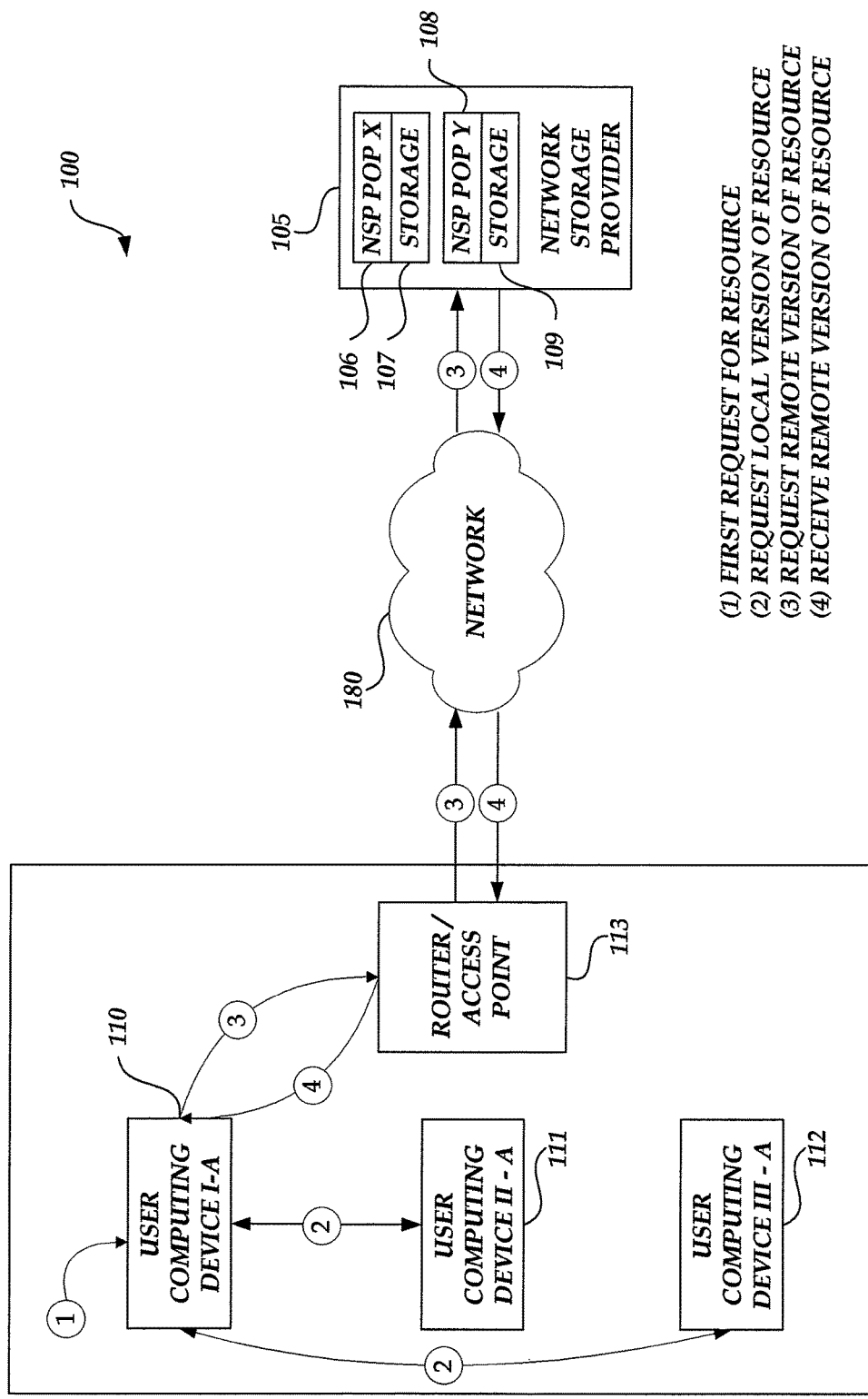
FIG. 4A illustrates one embodiment of the flow of data for requesting a resource.
Figure 4B:
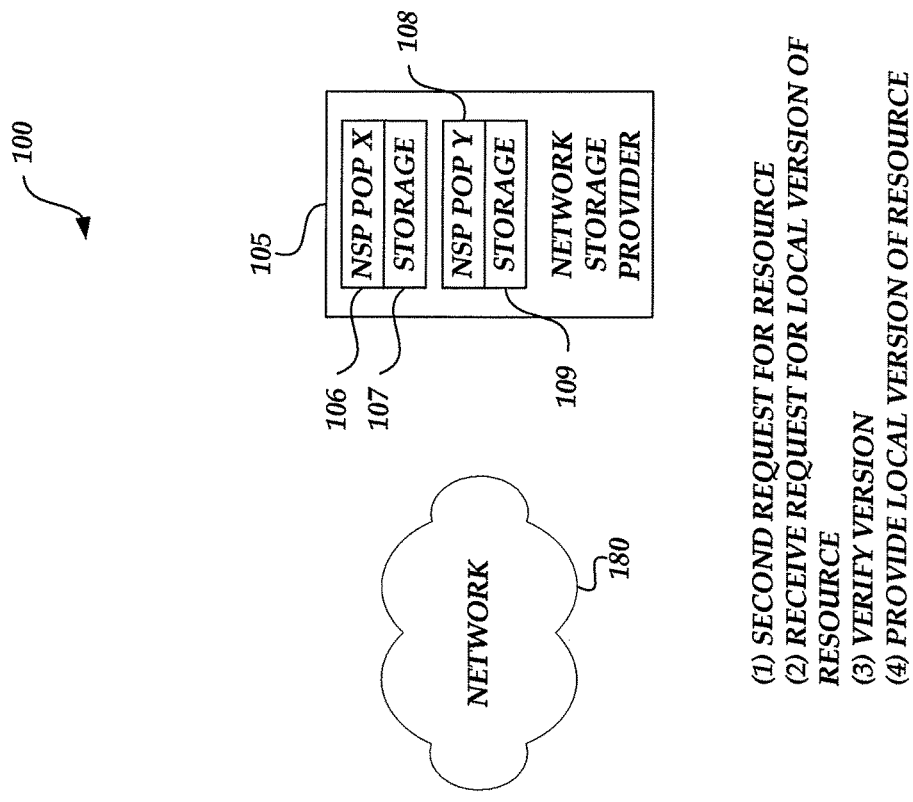
FIG. 4B illustrates one embodiment of the flow of data for requesting a resource available on a local area network.
Figure 4B:
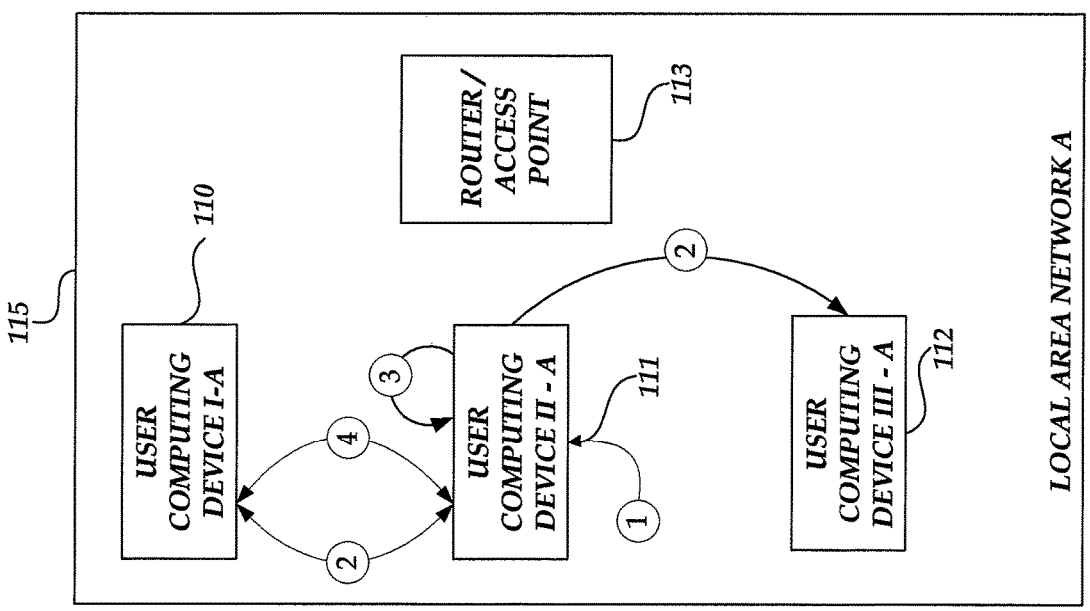

With reference now to FIGS. 3-5 the interaction between various components of the resource delivery environment 100 of FIG. 1 will be illustrated. For purposes of the example, however, the illustration has been simplified such that many of the components utilized to facilitate communications are not shown. It can be appreciated that such components can be utilized and that additional interactions would accordingly occur without departing from the spirit and scope of the present disclosure. In addition, for the purposes of simplicity, communications between user computing devices of the same LAN are shown via direct arrows even though, in some embodiments, such communication may go through the router/access point. As shown herein, data flow arrows going through the router/access point are meant to represent data flowing out a LAN and to the NSP, or out of the NSP and to the LAN.

Further, FIGS. 3-5 outline the temporal flow of data between the various components of the resource delivery environment 100. In particular, the circled numerals of FIGS. 3-5 represent an illustrative order in which data may flow between the various components according to one embodiment. In other embodiments, the functions outlined by the circled numerals may be performed in a different order, and may include fewer or additional functions.

FIG. 3A illustrates one embodiment of the flow of data for uploading and requesting a resource within the resource delivery environment 100. The flow of FIG. 3A already assumes that the user has configured user computing devices 110, 111, 112 with resource manger clients and servers. In addition, the flow assumes that each of the user computing devices 110, 111, 112 has a user's local allocation for resources and the user has established with NSP 105 a user's NSP allocation for resources.

Prior to (1), a user may select a resource stored on user computing device 110 to upload to the NSP 105. The selection of the resource may be done via a user interface component of the resource manger client 210. At (1), the resource is transmitted over the network 180 to NSP 105, where it may be stored in the user's NSP allocation of storage 107, 109. Once the NSP 105 stores the resource, it may update the metadata associated with resource and transmit the updated metadata, at (2), to the user computing devices 110, 111, 112 running a resource manager server instance. In the embodiment of FIG. 3A, the metadata for the resource might contain a unique resource ID assigned to the resource by the NSP 105 so that the resource may be identified across computing systems. The metadata may also provide location information of the resource indicating that the most recent version of the resource is available at the NSP 105 and at user computing device I-A 110. Thus, after the metadata has been updated to the user computing devices 110, 111, 112, each resource manger server instance is aware that the most recent version of the resource may be obtained from either user computing device I-A 110 or NSP 105.

At (3), a user may request the resource at user computing device II-A. Since user computing device II-A does not have a copy of the resource, the resource manager server executing on user computing device II-A may access its copy of the received metadata to determine if the resource is available within LAN A 115. After accessing the metadata, the resource manager server of user computing device II-A may determine that the resource is available from user computing device I-A 110 and request the resource from user computing device I-A 110. At (4), the user computing device I-A receives the request for the resource. In some embodiments, user computing device I-A may verify that user computing device II-A 111 has been authorized or authenticated to receive the resource. Once user computing device II-A has been authorized or authenticated, user computing device I-A provides the resource to user computing device II-A. Thus, the resource was provided to the user computing device II-A without the need to leave the LAN A, thereby resulting in more efficient provision of the resource.

FIG. 3B illustrates one embodiment of the flow of data for editing and uploading a resource. The embodiment of FIG. 3B is an extension of the flow of data from FIG. 3A; that is, the resource was uploaded at first through user computing device I-A 110 to the NSP 105 and then user computing device II-A 111 requested and received the resource from user computing device I-A 110. Moving to (1) of FIG. 3B, a user may edit the resource at user computing device II-A. After editing the resource, the version of the resource stored in the user's local allocation of user computing device II-A is the most recent version of the resource, whereas the version stored on the NSP 105 and the version stored on user computing device I-A is out of date. The user, after editing, the resource may upload the resource to the NSP 105 at (2). After uploading the resource, the NSP 105 may update the metadata associated with the resource and then, at (3), send the updated metadata to each of the user computing devices 110, 111, 112. Upon further requests for the resource from the user using user computing device I-A 110 or III-A 112, the resource manager servers may locally consult the updated metadata provided in (3) and request the resource from user computing device II-A 111.

The embodiment of FIGS. 3A and 3B illustrates that metadata may be updated at the NSP 105 and then transmitted to user computing devices 110, 111, 112. However, the transmission of metadata may vary from embodiment to embodiment. For example, in other embodiments, the metadata may be stored at the NSP 105, and user computing devices may request the metadata from the NSP at the time the user requests a resource. In other embodiments, the NSP 105 may send updated metadata to one of the user computing devices 110, 111, 112 that acts a "master" of the other user computing devices in the LAN. As such, the master user computing device may provide metadata on request to the other user computing devices connected to the LAN that are participating in the resource delivery environment 100.

FIG. 3C illustrates another embodiment of the flow of data for editing and uploading a resource. The embodiment of FIG. 3C is an extension of the flow of data from FIG. 3A; that is, the resource was uploaded at first through user computing device I-A 110 to the NSP 105 and then user computing device II-A 111 requested and received the resource from user computing device I-A 110. In addition, the embodiment of FIG. 3C is an alternative to the flow illustrated in FIG. 3B. In general, instead of the NSP 105 providing updated metadata to the user computing devices 110, 111, 112 after the resource was edited and uploaded to the NSP 105 as illustrated in FIG. 3B, the flow in FIG. 3C illustrates the user computing device II-A 111 providing updated metadata to the other user computing devices 110 and 112 after the resource was edited and uploaded to the NSP 105. More specifically, moving to (1) of FIG. 3C, a user may edit the resource at user computing device II-A. After editing the resource, the version of the resource stored in the user's local allocation of user computing device II-A is the most recent version of the resource, whereas the version stored on the NSP 105 and the version stored on user computing device I-A is out of date. The user, after editing, the resource may upload the resource to the NSP 105 at (2). After uploading the resource, the user computing device II-A 111 may update the metadata associated with the resource and then, at (3), send the updated metadata to each of the other user computing devices 110, 112 associated with LAN A 115. Upon further requests for the resource from the user using user computing device I-A 110 or III-A 112, the resource manager servers may locally consult the updated metadata provided in (3) and request the resource from user computing device II-A 111.

FIGS. 4A and 4B illustrates one embodiment of the flow of data for requesting a resource where resource manager servers poll each user computing device within the LAN before requesting the resource from the NSP 105. The embodiment of FIGS. 4A and 4B differs from the embodiment of FIGS. 3A and 3B in that the embodiment of FIGS. 4A and 4B do not depend on the use of metadata to determine the location of a resource. Although the embodiment of FIGS. 4A and 4B do not depend on metadata to determine the location of a resource, some embodiments may use the metadata to determine resource identifiers, version information, or status information of the resource.

FIG. 4B illustrates one embodiment of the flow of data for requesting a resource available on a local area network. At (1), the user computing device I-A 110 receives a first request for a resource from a user. The user may use, in some embodiments, the resource manager client 210 to request the resource. The requested resource may be among the resources that have been uploaded to the NSP before the user made the request. For example, the resource may be displayed in a list of all the resources available in the user's NSP allocation. In the embodiment of FIG. 4B, the resource manager server 220 determines that the requested resource is not available at user computing device I-A 110. As a result, it must request and receive the resource from either the other computing devices on LAN A 115 (user computing device II-A 111, user computing device III-A 112) or request the resource from the NSP 105.

In (2), the user computing device I-A 110 polls each of the computing devices on LAN A 115 for the requested resource. Illustratively, the user computing device I-A 110 may poll for specific resources or a generic request for all resources or sets of resources. The resource manager server 220 instance of user computing device I-A 110 may access the list or data structure of participating computing devices to determine those computing devices to poll. For example, in the embodiment of FIG. 4A, the resource manager server instance executing on user computing device I-A 110 may have discovered that user computing device II-A 111 and user computing device III-A 112 are devices participating in the resource deliver environment (that is, they are executing an instance of the resource manager server). In the embodiment of FIG. 4A, the user computing device I-A polls, or requests, the resource from each of the participating computing devices. In the illustrative embodiment of FIG. 4A, neither user computing device II-A nor user computing device III-A have the resource. As a result, both respond back to the user computing device I-A indicating the resource is not available.

Upon determining that the resource is not available on the LAN A 115, the user computing device I-A 110, at (3), may request the resource from the NSP 105. The resource manager server 220 executing on the user computing device I-A may request the resource using a resource identifier. Upon receiving the request, the NSP 105 may provide the resource to user computing device I-A 110 at (4).

FIG. 4B illustrates one embodiment of the flow of data for requesting the resource of FIG. 4A from a computing device located on the LAN A 115. The illustrative embodiment of FIG. 4B describes additional steps that may be performed after the steps illustrated in FIG. 4A.

At (1) of FIG. 4B, a user may make a second request for the resource, but the request may be made from user computing device II-A 111 instead of user computing device I-A. User computing device II-A may execute a resource manager server 220 instance that maintains a list or data structure of those computing devices that are participating in the resource delivery environment 100. The resource manager server of user computing device II-A may then consult the list or data structure and determine that both user computing device I-A 110 and user computing device III-A 112 are participating computing devices. In some embodiments, the resource manager server of user computing device II-A may also check to make sure that that both user computing device I-A 110 and user computing device III-A 112 have been authorized or authenticated to provide the resource. Then, at (2), user computing device II-A polls or requests the resource from each participating device: user computing device I-A 110 and user computing device III-A. As described above with respect to FIG. 4B, user computing device I-A has a copy of the requested resource and user computing device III-A does not have a copy of the requested resource. As a result, the user computing device II-A receives notification that the resource is available from user computing device I-A.

In some embodiments, the user may request the most recent version of a resource, a particular version of a resource (e.g., "version 3.2") or may request a minimum version of a resource (e.g., "at least version 3.2"). At (3), user computing device II-A 111 may check the version of the resource available from user computer device I-A to determine if it is the requested version of the resource. In some embodiments, the most recent version of the resource may be determined by checking the metadata of the resource available from user computing device I-A against the metadata of the resource available from NSP 105. In other embodiments, the metadata of the resource available from user computing device I-A may have status information indicating that the resource is the requested version. Once the user computing device II-A verifies that the version of the resource available form user computing device I-A is the requested version, it may then request and receive the resource at (4). In some embodiments, the user computing device I-A may check the metadata of the resource to ensure that user computing device II-A has been authorized or authenticated to receive the resource before providing it. Although the illustrative embodiment verifies the version of the resource available from user computing device I-A before receiving the resource from user computing device I-A, in other embodiments, verification may occur after the resource has been received.

Figure 5A:
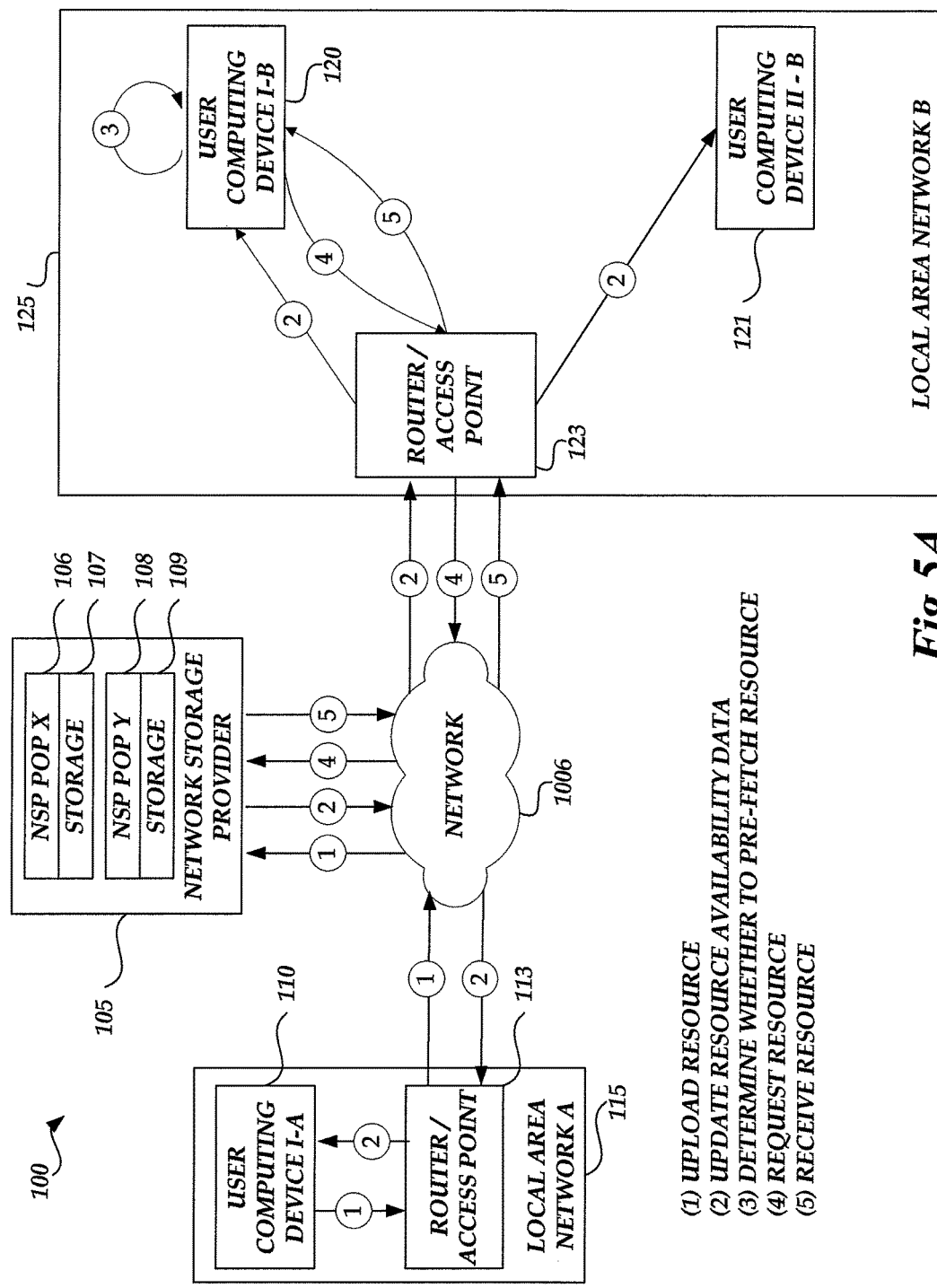
FIG. 5A illustrates one embodiment of the flow of data for pre-fetching a resource.

Turning now to FIG. 5A, an illustrative embodiment of the flow of data for pre-fetching a resource will now be described. At (1) of the embodiment of FIG. 5A, a user may upload a resource to the NSP 105. Once the resource had been provided to the NSP 105, resource availability data may be sent, at (2), to computing devices that are participating in the resource delivery environment 100. The resource availability data may be part of metadata that is periodically retrieved by resource manager server instances in the resource delivery environment 100. In the embodiment of FIG. 5A, user computing device I-A 110 (of LAN A), user computing device I-B 120 (of LAN B), and user computing device II-B 121 (of LAN B) are computing devices participating in the resource delivery environment 100. As a result, NSP 105 provides the resource availability data to each device at (2).

In the embodiment of FIG. 5A, the user computing device I-B has a pre-fetch module 230 which has been configured to pre-fetch resources. The pre-fetch module 230 may pre-fetch resources based on the type of resource (for example, word processing document, image, video) or some other criteria. At (3), the pre-fetch module 230 of user computing device I-B accesses and analyzes the resource availability data provided in (2) to determine if it should pre-fetch the resource from the NSP 105. For example, if the pre-fetch module 230 is configured to pre-fetch documents that are spreadsheets, and the resource is a spreadsheet, the pre-fetch module will request the resource from the NSP 105 at (4). If, however, the resource is an image, the pre-fetch module will not request the resource from the NSP 105 and will wait until it receives updated resource availability data. When it receives updated resource availability data, it may perform (3) again. Once the pre-fetch module 230 has requested the resource at (4), the NSP 105 may provide the resource to user computing device I-B at (5).

In the embodiment of FIG. 5A, the user did not request the resource using user computing device I-B, rather, the resource was pre-fetched from the NSP 105 automatically based on the configuration of the pre-fetch module. As stated above with respect to FIG. 2, in some embodiments, the pre-fetch module may be configured with pre-fetch parameters so that the user may customize the pre-fetch behavior of the module. By pre-fetching resources, the user computing device I-B may provide more efficient access to resources that are of interest to the user while the user is using user computing device I-B 120.

Figure 5B:
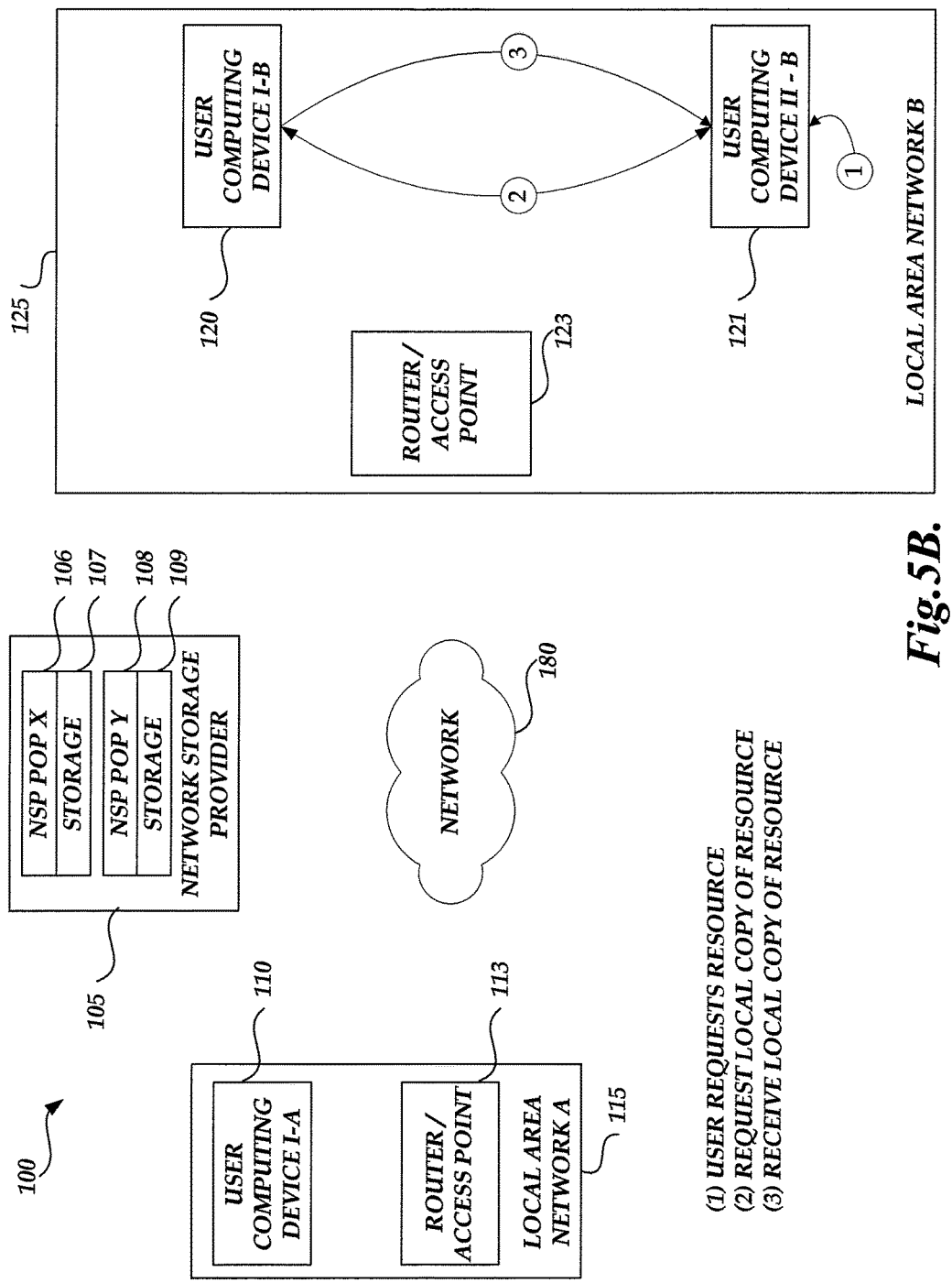
FIG. 5B illustrates one embodiment of the flow of data for requesting a pre-fetched resource available on a local area network.

FIG. 5B illustrates one embodiment of the flow of data for requesting the pre-fetched resource of FIG. 5A from a computing device located on the LAN B 120. The illustrative embodiment of FIG. 5B describes additional steps that may be performed after the steps illustrated in FIG. 5A.

FIG. 5B illustrates one embodiment of the flow of data for requesting a pre-fetched resource available on a local area network. In the embodiment of FIG. 5B, user computing device II-B does not have a pre-fetch module configured to pre-fetch the resource. The user at (1), may request the resource using user computing device II-B 121. The resource manager server instance of user computing device II-B may then, at (2), request the resource from user computing device I-B. In some embodiments, resource manager server instance of user computing device II-B may access and analyze metadata of the resource to determine the location of the most recent version of the resource (similar to the process described in FIGS. 3A and 3B) or in other embodiments may poll all participating computing devices of the LAN B 125 to determine if the devices have the resource (similar to the process described in FIGS. 4A and 4B). After the user computing device II-B 121 requests the resource from user computing device I-B 120, the user computing device II-B 121 receives the resource at (3). In some embodiments, the user computing device II-B 121 may verify that the version of the resource available at user computing device II-A is the most recent version as described above with respect to (3) of FIG. 4B.

Examples of Process Flow

Figure 6A:
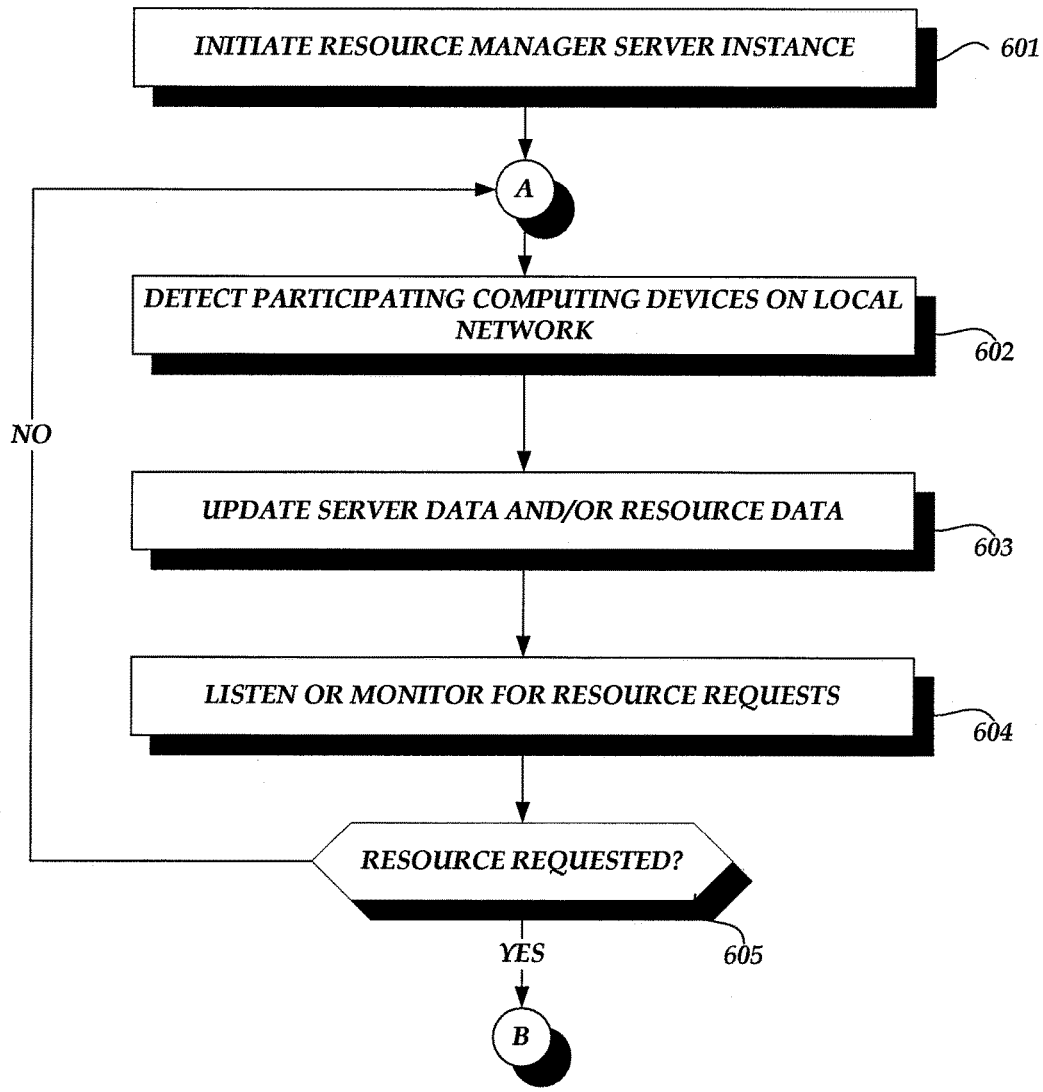
FIG. 6A is a flowchart illustrating one embodiment of the flow of data for initiating a resource manager server instance and listening for requests for resources.
Figure 6B:
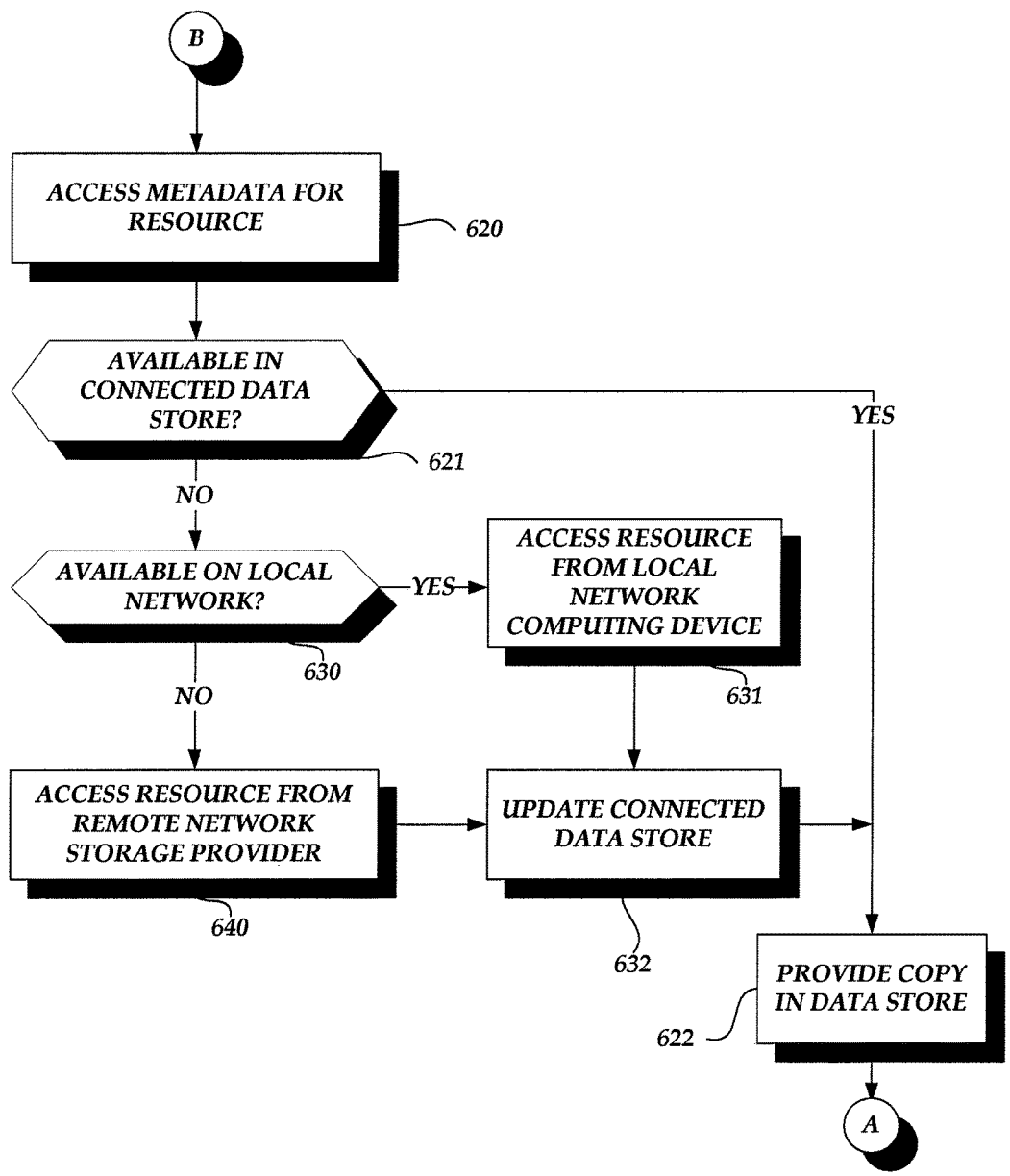
FIG. 6B is a flowchart illustrating one embodiment of the flow of data for providing a resource in response to a request for the resource.
Figure 6C:
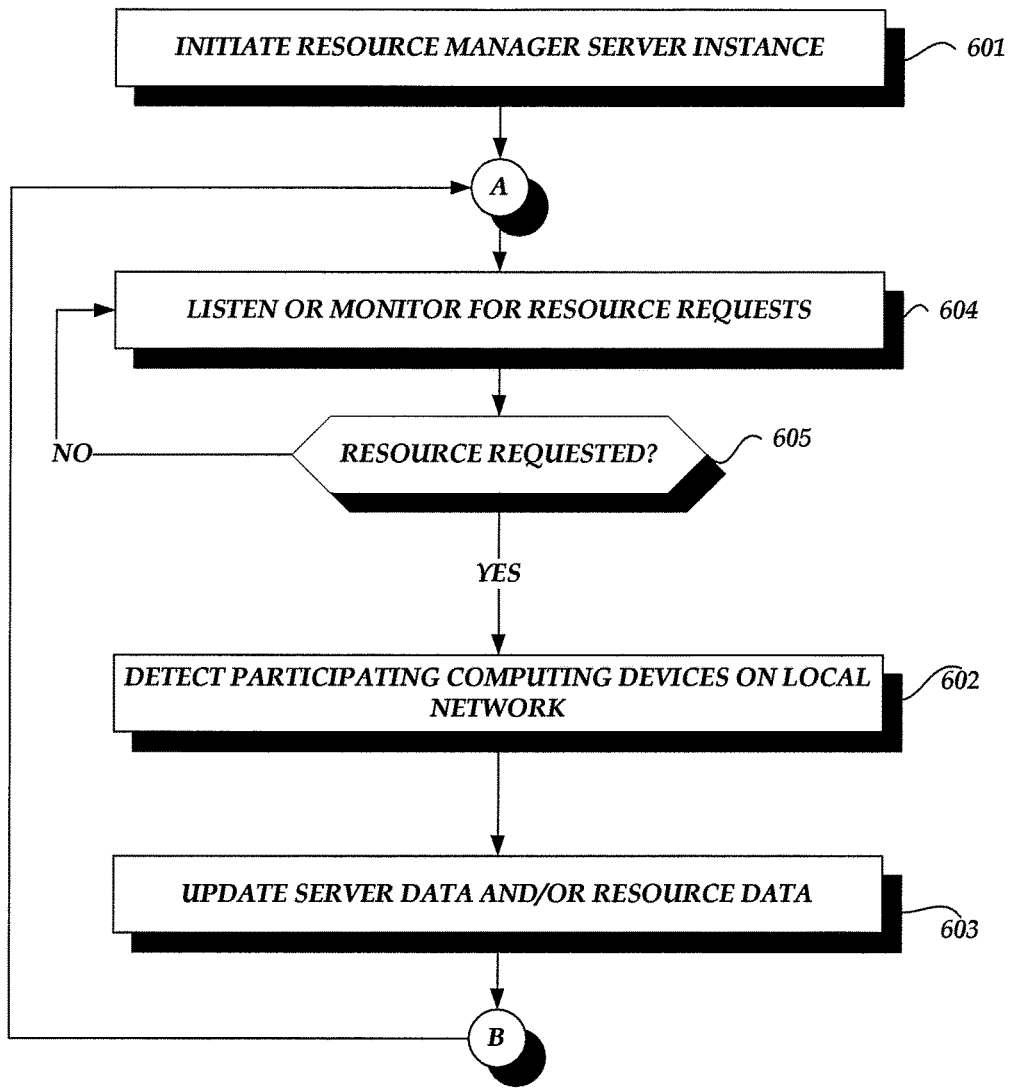
FIG. 6C is a flowchart illustrating another embodiment of the flow of data for initiating a resource manager server instance and listening for requests for resources.

FIGS. 6A-6C illustrate examples of embodiments of the process flow for embodiments of the resource delivery environment 100. Depending on the embodiment, the processes and methods of FIGS. 6A-6C may include fewer or additional blocks and/or the blocks may be performed in a different order than is illustrated. For ease of explanation, the processes and methods will be described herein as performed by one or more specific computer systems. However, other computer systems or modules may perform the process and methods without changing the overall scope of functionality of certain embodiments. Software code configured for execution on a computing device in order to perform the methods may be provided on a tangible computer readable medium, such as a compact disc, digital video disc, flash drive, hard drive, memory device or any other tangible medium. Such software code may be stored, partially or fully, on a memory of a computing device, such as the user computing device 110, and/or other computing devices illustrated in the figures described herein to perform the respective methods.

FIG. 6A is a flowchart illustrating one embodiment of the flow of data for initiating a resource manager server instance and listening for requests for resources. At block 601, an instance of the resource manager server 220 is initiated. The resource manager service may be a daemon that is started during the start up of the user computing device 110, or in other embodiments, may be started at the user's request. In some embodiments, the initiation of the resource manager server instance may start upon the user launching the resource manager client 210. In some embodiments, at initiation, the resource manager server 220 may establish a socket server on a dedicated port to listen for any incoming socket connection requests. The resource manager server 220 may also be configured to periodically broadcast notification packets that notify any other resource manager instance on its LAN that the resource manager server 220 is available to receive requests for resources. Processing may then move to block 602.

At block 602, the resource manager server 220 detects other computing devices on the network that are participating in the resource delivery environment 100. In some embodiments, the resource manager server 220 interfaces with, or includes, a packet analyzer that detects notification packets sent by other resource manager server instances on the network. In other embodiments, the resource manger server 220 may leverage network utilities of the user computing device's 110 operating system to detect all computing devices on the LAN and then attempt to establish a connection with the detected computing devices on an established port. If the connection is successful, the resource manager server 220 will know that the computing device is executing a resource manager server instance.

Once the participating devices are detected, processing moves to block 603. The resource manager server 220 may maintain a list or data structure of available resource manager servers on its LAN. In some embodiments, the resource manager server instance may also receive resource metadata from the other resource manager server instances on the LAN. At block 603, the resource manager server 220 may also update the metadata of the resources that are part of the user's local allocation. For example, the resource manager server 220 may communicate with the NSP 105 to retrieve the metadata for all resources of the user's NSP allocation and compare it with the metadata of the user computing device 110 to determine if there have been any changes in the metadata.

After the resource manager server 220 has updated available server and resource data in block 603, at block 604, the resource manager server 220 may listen for requests for resources. In some embodiments, the resource manager server 220 may expose a port for receiving resource requests. The requests may come from other resource manager service instance daemons executing within the LAN. In some embodiments, the resource manager client 210 may request the resource manager server 220 to retrieve a resource. The resource manager client 210 may communicate with the resource manager server 220 through the listening port, or in other embodiments, may communicate with the resource manager server through an API or other software interface. In some embodiments, the resource manager server 220 may refresh the server and resource data by executing the process flow again starting with block 602. The process flow may return to block 602 after a particular time-to-live ("TTL"). The TTL may be configured by the user, or in other embodiments, may be set to a fixed value programmatically. In other embodiments, blocks 602 and 603 may be executed concurrently in a separate processing thread, thereby continuously refreshing server and resource data. At block 605, when a resource has been requested, process flows to subroutine B. Subroutine B is described in greater detail with respect to FIG. 6B.

FIG. 6B is a flowchart illustrating one embodiment of the flow of data for providing a resource in response to a request for the resource. At block 620, the metadata for the resource is accessed. In some embodiments, the metadata is local to the user computing device 110 and the resource manager server 220 may access the metadata locally. In some embodiments, the metadata may be accessed from the NSP 105, or in other embodiments may be accessed by another computing device within the LAN. The resource manager server 220 may analyze the metadata and determine that most recent version of the resource is available in the data store 204 of the user computing device at block 621. If so, processing moves to block 622 and the resource is provided to the requester. If the resource is not available in the data store 204, the resource manager server 220 may analyze the metadata to determine if the resource is available on the LAN. If the resource is available on the LAN, processing moves to block 631 where the resource is accessed from the computing device on the local network storing the resource. Once accessed, the connected data store 204 is updated to have a copy of the most recent version of the resource. Process then flows to block 622. If the resource is not available on the LAN, then the resource manager server may access the resource from the remote NSP 105. Once accessed, the connected data store 204 is updated and the resource is returned to the requester at block 622.

FIG. 6C is a flowchart illustrating one embodiment of the flow of data for initiating a resource manager server instance and listening for requests for resources. FIG. 6C is similar to FIG. 6A in that the description of the process for each block is the same for FIG. 6C as it is for FIG. 6A. The process flow for FIG. 6C, however, occurs in a different order. Specifically, in FIG. 6C, blocks 602 and 603 are performed in response to a request for a resource from a user. In the embodiment illustrated in FIG. 6C, once the resource manager server 220 has been initiated, it may listen for requests from a resource. Once it receive the request, it may then detect any participating computing devices on the LAN, update server and resource data, and move to subroutine B to retrieve the resource.

Although certain embodiments have been described in the context of a local area network, other embodiments of the resource delivery environment may be used to manage resources across networks where accessing a resource from remote NSP may less efficient than accessing the same resource from a node within the network.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for retrieving a resource for a user comprising:
   determining, by a first computer device on a local area network, one or more computer devices connected to the local area network and configured to host resources, wherein the local area network comprises a local access point, each of the one or more computer devices are connected to the local access point, wherein a remote network storage provider is not connected to the local area network and the one or more computer devices communicate with remote network storage provider via the local access point;
   receiving, by the first computer device, a request for a resource;
   transmitting a request to at least one of the one or more computer devices connected to the local area network to determine whether the resource is available from the one or more computer devices connected to the local area network;
   receiving responses from the at least one of the one or more computer devices connected to the local area network indicating whether the resource is available from the one or more computer devices connected to the local area network;
   if the received responses from the one or more computer devices indicate that the resource is available,
      accessing, by the first computer device, an indication that the resource is available from a second computer device of the one or more computer devices connected to the local area network; and
      requesting, by the first computer device, the most recent version of the resource hosted by the second computer device of the one or more computer devices connected to the local area network; and
      determining, by the second computer system, whether the first computer system is authorized to receive the resource based, at least in part, on metadata comprising authorization information associated with the resource, wherein the metadata includes an encrypted token that allows access to the resource to computer devices capable of decrypting the token;
   if the received responses from the one or more computer devices indicate that the resource is not available, requesting, by the first computer device, the resource from the remote network storage provider that is not connected to the local area network.

2. The method of claim 1 further comprising:
   monitoring, by the first computer device, resource availability data, the resource availability data comprising an indication of a plurality of available resources from the second computer device or the remote computer system;
   determining, by the first computer device, whether the first computer device should pre-fetch one of the plurality of available resources; and
   automatically pre-fetching, by the first computer, the one of the plurality of from the second computer device or the remote computer system.

3. The method of claim 2, wherein the determining whether the first computer device should pre-fetch one of the plurality of available resources is based at least in part on the last accessed time of the plurality of resources.

4. The method of claim 2, wherein the determining whether the first computer device should pre-fetch one of the plurality of available resources is based at least in part on a type of the plurality of resources.

5. The method of claim 1, wherein the one or more computer devices are connected to the local access point using a wired connection or a wireless connection.

6. The method of claim 1, transmitting a request comprises polling each of the one of the one or more computer devices connected to the local area network to determine whether the resource is available from the one or more computer devices connected to the local area network.

7. A computer system connected to a local area network, the computer system comprising:
a processor;
a computer readable medium storing software instructions that when executed cause the processor to:
  detect one or more participating local computer devices, each of the participating local computer devices connected to the local area network and configured to provide resources to the other participating local computer devices, wherein the local area network comprises a local access point, each of the one or more participating local computer devices within the local area network are connected to the local access point, wherein a remote network storage provider is not connected to the local area network and the one or more participating local computer devices communicate with remote network storage provider via the local access point;
  receive a request for a resource;
  transmit a request to one or more of the participating local computer devices to determine whether the resource is available from one of the participating local computer devices within the local area network;
  receive responses from the one or more of the participating local computer devices indicating whether the resource is available from the one or more participating local computer devices;
  if the received responses indicate that the resource is available from one of the participating local computer devices within the local area network,
    request the resource from the participating local computer device that has the resource;
    receive the requested resource from the participating local computing device if the participating local computer device determines that the computer system is authorized to receive the requested resource based at least in part on authorization information included within the metadata of the resource, wherein the metadata includes an encrypted token that allows access to the resource to computing devices capable of decrypting the token; and
  if the received responses indicate that the resource is not available from one of the participating local computer devices within the local area network, request the resource from the remote network storage provider not connected to the local area network.

8. The system of claim 7, wherein the software instructions stored in the computer readable medium further cause the processor to receive resource description data from the remote computer system.

9. The system of claim 7, wherein the software instructions stored in the computer readable medium further cause the processor to receive resource description data from one of the participating computer devices.

10. The system of claim 7, wherein the software instructions stored in the computer readable medium further cause the processor to:
  receive resource availability data from the remote computer system, the resource availability data indicating a plurality of available resources from the remote computer system;
  determine whether to pre-fetch one of the plurality available resources; and
  automatically pre-fetch one of the plurality of available resources from the remote computer system.

11. The system of claim 10 wherein the determining whether to pre-fetch one of the plurality of available resources is based at least in part on the last accessed time of the plurality of resources.

12. The system of claim 10 wherein the determining whether to pre-fetch one of the plurality of available resources is based at least in part on a type of the plurality of resources.

13. The system of claim 7, wherein the software instructions stored in the computer readable medium further cause the processor to modify the resource availability data to reflect that the system has an updated version of the resource.

14. The system of claim 13, wherein the resource is stored by the computer system with a first attribute, and the software instructions stored in the computer readable medium further cause the processor to provide the resource to the requesting computer device with a second attribute.

15. The system of claim 14, wherein the resource is a video resource and the software instructions stored in the computer readable medium further cause the processor to stream the resource to the requesting computer device.

16. The system of claim 7, wherein the request for the resource comprises a requested version, and wherein the software instructions stored in the computer readable medium further cause the processor to verify that the resource from the local computer device hosting the resource matches the requested version.

17. A non-transitory computer readable medium storing software instructions that when executed by a processor of a computer system, cause the processor to:
  receive information describing resources available from a remote network storage provider that is not connected to a local area network of the computer system;
  detect one or more participating local computer devices, each of the participating local computer devices connected to the local area network, wherein the local area network comprises a local access point, each of the one or more participating local computer devices within the local area network are connected to the local access point, wherein the one or more participating local computer devices communicate with the remote network storage provider via the local access point;
  receive a request for a resource;
  transmit a request to one or more of the participating local computer devices to determine whether the most recent version of the updated resource is located on one of the participating local computing devices within the local area network;
  receive responses from the one or more of the participating local computer devices indicating whether the resource is available from the one or more participating local computer devices;
  if the received responses indicate that the resource is located on one of the participating local computing devices within the local area network,
    request the resource from the participating local computer device that has the resource;

receive the requested resource from the participating local computing device if the participating local computer device determines that the computer system is authorized to receive the requested resource based at least in part on authorization information included within the metadata of the resource, wherein the metadata includes an encrypted token that allows access to the resource to computer devices capable of decrypting the token; and if the received responses indicate that the resource is not available from one of the participating local computer devices within the local area network, request the resource from the remote network storage provider.

18. The non-transitory computer readable medium of claim 17, wherein the software instructions stored in the computer readable medium further cause the processor to determine that the requesting computer devices has been authorized to receive the stored resource.

19. The non-transitory computer readable medium of claim 17, wherein the stored resource has a first characteristic, and the software instructions stored in the computer readable medium further cause the processor to provide the resource to the requesting computer device with a second characteristic.

20. The non-transitory computer readable medium of claim 17, wherein the stored resource is a video resource, and software instructions stored in the computer readable medium further cause the processor to stream the stored resource to the requesting computer device.

21. The non-transitory computer readable medium of claim 17, wherein the software instructions stored in the computer readable medium further cause the processor to periodically broadcast a notification data packet that provides an indication that the system is a participating local computer device.

22. The non-transitory computer readable medium of claim 17 wherein the software instructions stored in the computer readable medium further cause the processor to detect the one or more participating local computer devices by receiving notification data packets sent by the participating local computer devices.

23. The non-transitory computer readable medium of claim 17 wherein the software instructions stored in the computer readable medium further cause the processor to detect the one or more participating local computer devices by determining all of the computer devices connected to the local area network and attempting to establish a connection to a port configured to receive requests for resources.

* * * * *